350-427
OR 3,682,534

United States Patent
Cook et al.

[15] 3,682,534
[45] Aug. 8, 1972

[54] OBJECTIVES OF VARIABLE FOCAL LENGTH

[72] Inventors: Gordon Henry Cook, Oadby, England; Francois Rene Laurent, Yverdon, Switzerland

[73] Assignee: The Rank Organisation Limited, London, England

[22] Filed: Jan. 8, 1971

[21] Appl. No.: 104,975

Related U.S. Application Data

[63] Continuation-in-part of Ser. No. 830,754, June 5, 1969, abandoned.

[30] Foreign Application Priority Data

June 6, 1968 Great Britain..........26,981/68

[52] U.S. Cl.................................................350/186
[51] Int. Cl...........................................G02b 15/14
[58] Field of Search............................350/184, 186

[56] References Cited

UNITED STATES PATENTS 3,481,664  12/1969  Takano..................350/186 X

*Primary Examiner*—David Schonberg
*Assistant Examiner*—Paul A. Sacher
*Attorney*—Holcombe, Wetherill & Brisebois

[57] ABSTRACT

A zoom lens front member which is divergent and is divided into two divergent parts, of which the rear part only is movable for focusing purposes, in accordance with the following relationships:

$4.2 F_A > f_{A1} > 1.5 F_A$
$3.0 F_A > f_{A2} > 1.3 F_A$
$3.0 f_{A2} > f_{A1} > 0.6 f_{A2}$ where $F_A$ is the equivalent focal length of the complete objective when focused for infinity and $f_{A1}$ and $f_{A2}$ are the equivalent focal lengths of said front and rear parts.

10 Claims, 11 Drawing Figures

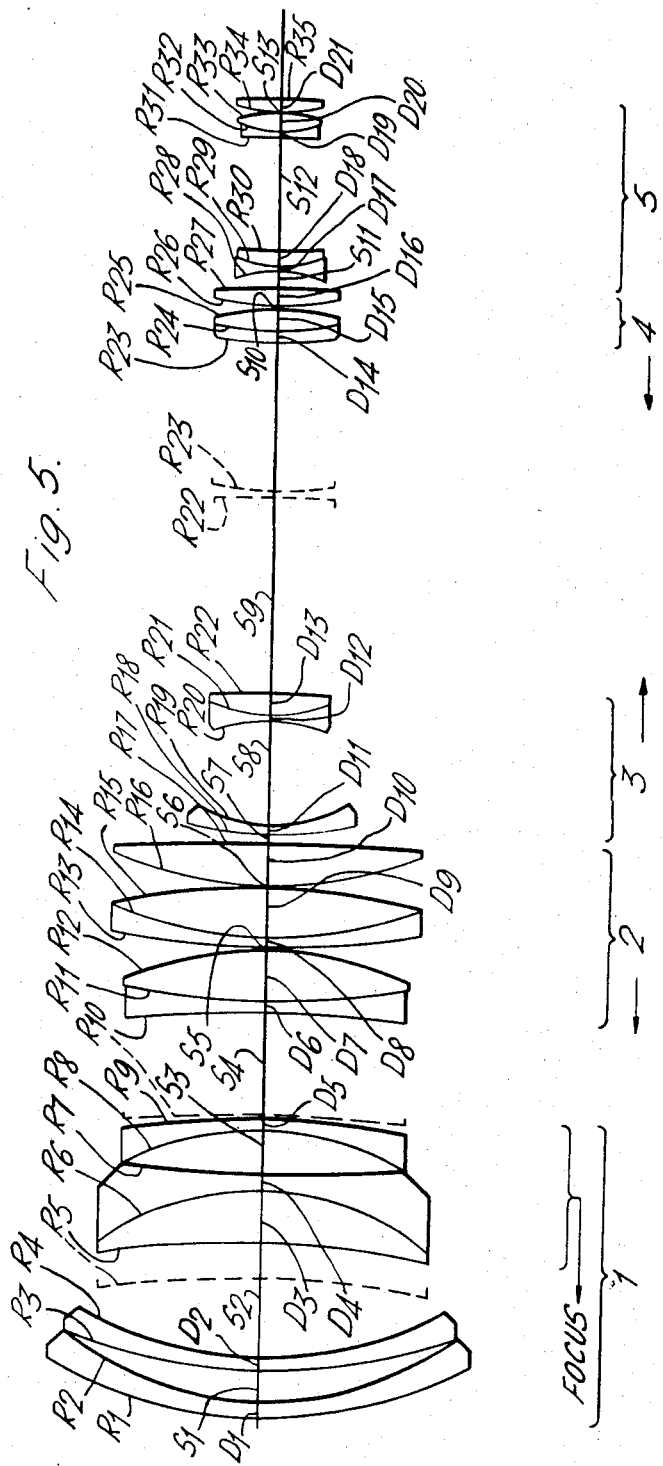

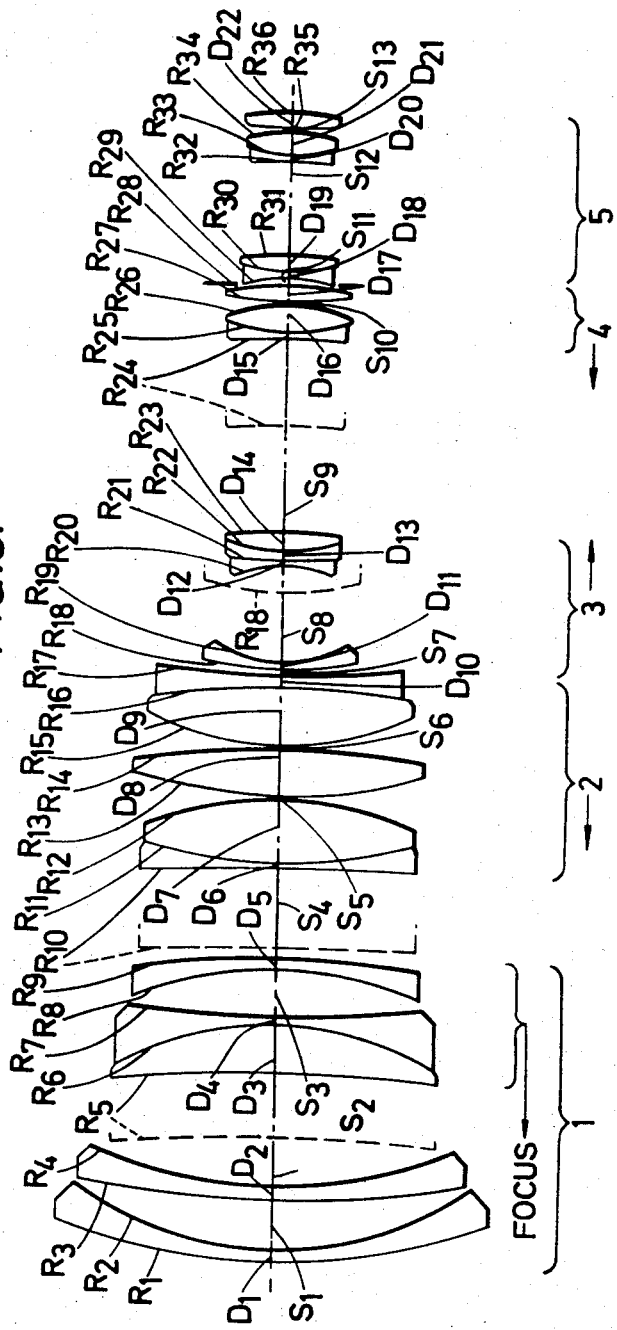

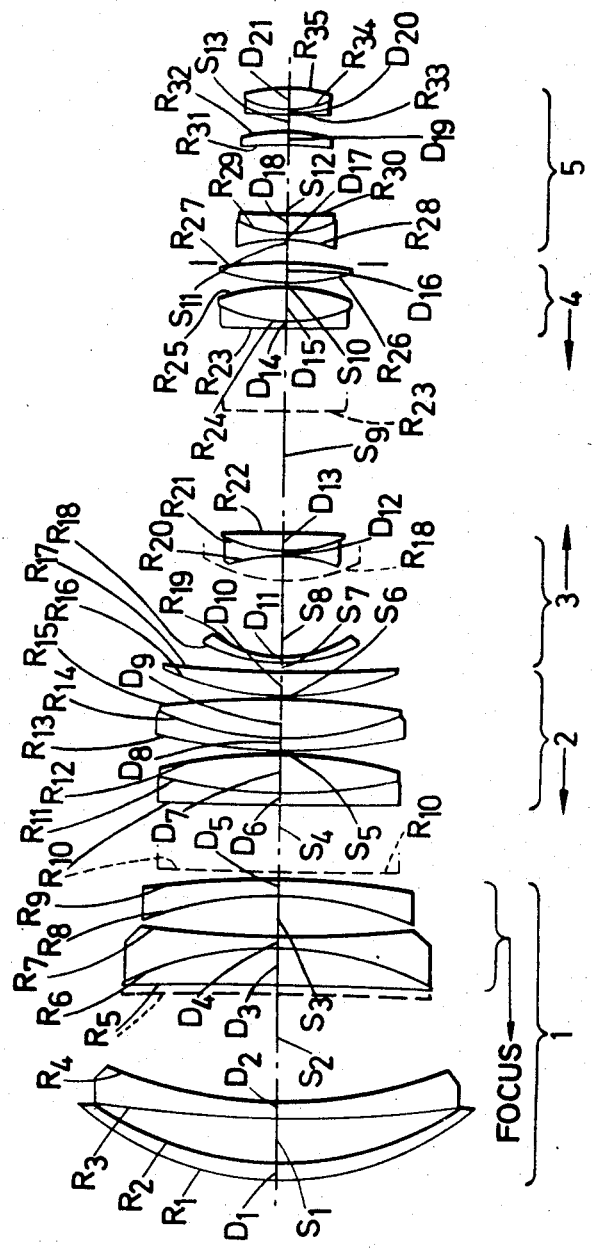

OBJECTIVES OF VARIABLE FOCAL LENGTH

BACKGROUND OF THE INVENTION

This invention is a continuation-in-part of our application Ser. No. 830754 filed June 5, 1969, and now abandoned and relates to an optical objective for photographic or other purposes, having relatively movable members whereby the equivalent focal length of the objective can be continuously varied throughout a range while maintaining constant the position of the image plane. Such optical objectives are commonly known as "zoom lenses," the variation of focal length being effected under the control of a zoom control element. Accommodation for change of object position is usually achieved by imparting an independent movement to one member of the objective under the control of a focussing control element.

Various types of zoom objectives are known, most of which may conveniently be considered as comprising front and rear assemblies, of which the rear assembly is stationary, the members movable for zooming being included in the front assembly. Usually, such an objective is provided with four or five members, a stationary rear member constituting the rear assembly and two or three members movable for zooming to the rear of a front member which is stationary as far as zooming is concerned, these last mentioned members constituting the front assembly. The provision for focusing is usually made at the front member of the front assembly, and the present invention is concerned with a zoom objective having this focusing provision.

In modern zoom objectives, the front member must have a relatively wide aperture and if made bodily movable to effect focusing, must therefore be of a relatively complex structure in order to facilitate correction of the various aberrations not only throughout the zooming range but also throughout the focusing range, this complexity making the front member quite heavy and bulky. However, it is of utmost importance to keep the weight and bulk of the complete objective, including its operating mechanisms, within easily manageable proportions, and clearly the front member of the objective, which is of relatively large diameter, is in this respect of major importance.

PRIOR ART

In order to minimize the complexity, size and weight of the part of the objective to be moved for focusing, and in order to reduce strain on the focusing mechanisms, two solutions have been proposed for a zoom lens having a convergent front member. According to one proposal, the front member is divided into a divergent front part and a convergent rear part, and according to the other proposal such front member is divided into an approximately afocal front part and a convergent rear part. In the first case only the front part of the front member is movable for focusing, the rear part remaining stationary, while in the second case only the rear part of the front member is movable for focusing, the front part remaining stationary, thereby to give the added advantage of avoidance of "air pumping" due to change of the of the air space within the objective. In the second of these prior proposals, aberration correction, especially in respect of chromatic aberrations and stability with focusing of spherical aberration, is concentrated in the stationary front part of the front member.

OBJECTS OF THE INVENTION

The present invention has for a general object to provide the above-mentioned advantages in the case of a zoom lens having a divergent front member, and for a more specific object to provide a zoom lens in which change of angular field in the object space during focusing is at least minimized.

In the latter connection, it should be explained that when a conventional fixed focal length objective in a camera is focused for differing object distances, the change in angular field of view in the object space is not very perceptible, either because the movement of the objective required for focusing is small, or because the depth of field is small so that the predominant effect is one of change of focus masking the change in angular field. However, this is not true in zoom lenses, due to the fact that the depth of field is relatively large at minimum focal length and the movement required, for example of the front member, to effect true focusing is also large relative to said minimum focal length. The apparent effect thereof, at least with the zoom lens set at or near its minimum focal length, is that objects at all distances remain in focus, sufficiently to be recognizable, throughout the range of focusing movement.

Moreover, in known zoom lenses, the focusing movement of the front member introduces a significant change in magnification and thus variation of the angular field in the object space. As this change in angular field is not masked by a clear focusing effect, the result is a subjective impression that zooming is taking place, even though only focusing is being performed. This characteristic is undesirable and has prejudiced the usefulness of zoom lenses in some applications, such as broadcast television. The above mentioned specific object of the invention is in effect to avoid or minimize this undesirable characteristic.

BRIEF SUMMARY OF THE INVENTION

According to the present invention, in an optical objective of the zoom type comprising a stationary rear assembly and a front assembly which includes the members movable for zooming behind a divergent front member which remains stationary during zooming, there is provided an improved front member which is divided into divergent front and divergent rear parts of which only the rear part is axially movable to effect focusing to suit differing object positions, said front member being characterized by the following relationships:

a. $4.2 F_A > f_{A1} > 1.5 F_A$
b. $3.0 F_A > f_{A2} > 1.3 F_A$
c. $3.0 f_{A2} > f_{A1} > 0.6 f_{A2}$ where $F_A$ is the equivalent focal length of the complete front member for an infinitely distant object and $f_{A1}$ and $f_{A2}$ are the equivalent focal lengths of the front and rear parts, respectively, of the front member.

For the purpose of maintaining the field angle constant during focusing it is usually desirable for $f_{A1}$ to be of the order of $2.5 f_{A2}$. However, in order to facilitate the solution of aberrational problems the use of high surface powers is to be avoided as far as possible to which end it is advantageous more evenly to divide the divergent power of the front member between the front and rear parts thereof. Indeed, it may even be desirable sometimes to make $f_{A2}$ slightly greater than $f_{A1}$. More usually, a compromise, whereby $f_{A1}$ lies somewhere between $f_{A2}$ and $2.5 f_{A2}$, is desirable.

EXPLANATION

By comparison with a zoom objective having a convergent front member, it is well known that a divergent front member can be, in itself, advantageous from the point of view of focusing requirements. In particular, as the angular field behind a divergent front member is less than that in the object space, generally speaking such a divergent member may be of smaller diameter and involve smaller axial movement than a convergent front member, in order to obtain an equivalent focusing effect. This invention therefore, which provides a two part divergent front member, gives rise to the possibility of achieving focusing down to an extremely short object distance by use of a front member of the minimum complexity, bulk and weight necessary to provide for good aberration correction throughout the zooming and focusing ranges, in association with any suitable conventional focusing mechanism of low torque, since only a part of the front member has to be moved.

However, a more particular advantage of the invention will be explained with reference to the accompanying drawings, in which:

FIGS. 1A and 1B diagrammatically and graphically illustrate the effect on angular field in the object space when focusing is performed in a known zoom lens; and FIGS. 2A and 2B diagrammatically and graphically illustrate the same effect for a possible embodiment of the zoom lens according to the invention.

In FIG. 1A the reference 10 designates the divergent front member of a zoom lens, which member is bodily movable for focusing, from the position marked in solid line for an object at infinity to the position marked in broken line for a close object. $d$ designates the object distance; $u$ designates the focusing movement; $\alpha$ designates the field semi-angle, which is constant, on the image side of the front member; and $B^1$ the field semi-angle in the object space. In connection with this Figure, reference is made to the following Table, wherein the values of $d$ and $u$ are based on the equivalent focal length $(f_A)$ of the divergent front member 10, equal to 42.55:

| d | ∞ | 1014.89 | 574.89 | 264.89 | 139.89 | 77.39 |
|---|---|---|---|---|---|---|
| u | 0 | 1.71 | 3.25 | 5.89 | 9.92 | 15.10 |
| B¹ | 29°41' | 29°51' | 30°2' | 30°17' | 30°40' | 31°13' |

FIG. 1B shows the change of $B^1$ with $d$ graphically, clearly demonstrating the increase in field angle in the object space which takes place as the objective is focused down from an object at infinity to a close object.

In FIG. 2A, the references $11^1$ and $11^{11}$ designate the divergent front and divergent rear parts of an embodiment of the objective according to the invention, wherein only the rear part $11^{11}$ is movable for focusing, from the position marked in solid line for an object at infinity to the position marked in broken line for a close object. The field semi-angle in the object space is designated B. The references $d$, $u$ and $\alpha$ have the same designations as in FIG. 1A, which is associated with the following Table, wherein the values of $d$ and $u$ are again based on the equivalent focal length $(f_A)$ of the divergent front member, which is equal to that of the front member of the known objective (42.55) when the two divergent parts ($f_{A1} = 170.1$ and $f_{A2} = 68.5$) are separated by the distance $e$ (equal to 35.0) for focusing an object at infinity:

| d | ∞ | 993.13 | 493.13 | 243.13 | 118.13 | 55.63 |
|---|---|---|---|---|---|---|
| u | 0 | 1.85 | 3.40 | 6.20 | 11.93 | 20.34 |
| B | 29°41' | 29°41' | 29°41' | 29°41' | 29°41' | 29°41' |

FIG. 2B is a graph of B plotted against $d$, clearly demonstrating that, in accordance with the invention, the field angle in the object space can be kept constant as the objective is focused down from an object at infinity to a close object.

Thus, we have found that this particular advantage can be achieved with the construction of two-part divergent front member previously specified, provided that the ratio $f_{A1} : f_{A2}$ is appropriately selected. In the embodiment represented in FIG. 2A this ratio is equal to 2.5.

However, in practice, as previously mentioned, this ratio of $f_{A1} : f_{A2}$ must also be used as a design parameter assisting the achievement of a high standard of aberration correction, which is a further object of the invention fulfilled by subsidiary features, as particularized hereinafter. Therefore, in practical embodiments of the invention, some compromise is usually necessary between the contribution that the front member of the objective makes to aberration correction and that which it makes to maintaining constant the field angle in the object space. Nevertheless, it is apparent from FIGS. 1B and 2B that the objective according to the invention, having a front member consisting of two divergent parts of which only the rear part is movable for focusing, can clearly be designed to improve significantly on the known lens in respect of minimizing the change in field angle on the object side when focusing is carried out.

In addition, $f_{A2}$ must be limited in terms of $F_A$, in particular not to be greater than 3.0 $F_A$, so that focusing to the required extent is possible within an acceptable range of travel, and also not to be less than 1.3 $F_A$ so as again to avoid introduction of high powers and additionally in effect to avoid bulkiness of the front member. The limitations, in conjunction with the above specified ratio, effectively determine limits for $f_{A1}$ in terms of $F_A$.

The relationships above specified define the limits for an optimum thin lens design which is compatible with the selection of practical parameters in the corrected front member of a zoom lens requiring a divergent front member. In all modern zoom lenses having divergent front members, the requirements for aberration correction, having due regard to the stop position, are generally the same, so that the specified relationships are of general applicability independent of any particular construction of complete objective.

It is to be understood that the terms "front" and "rear" as used herein relate respectively to the side of the objective nearer to and further from the longer conjugate, as is usual in the art. It should also be mentioned that the term "internal contact," as will be used hereinafter, is intended to include not only a cemented contact surface but also a "broken contact," which achieves an equivalent optical effect by means of two contacting surfaces of very slightly differing radii, the radius of the internal contact in the latter instance being the arithmetic mean between the radii of curvature of the individual surfaces in question.

FURTHER FEATURES OF THE INVENTION

Unlike the prior proposals relating the a zoom lens having a convergent front member, in the present invention aberration correction is distributed between the two parts of the divergent front member but concentrated in the movable rear part. Thus, for correction of chromatic aberrations, the rear part preferably includes at least one collective element made of a highly dispersive material of mean refractive index greater than 1.7 and of Abbe V number less than 32, preferably less than 26, and one or more dispersive elements made of a material or materials having an Abbe V or average Abbe V number greater than 1.5 times, preferably at least 1.9 times, that of the collective element, while the front part preferably includes one or more dispersive elements, conveniently two simple meniscus components convex to the front, of a material or materials having an Abbe V number or average Abbe V number in excess of 45, and generally in excess of 49. For stabilization of spherical aberration with change of object distance, the rear part preferably includes a compound component having a collective internal contact, usually but not exclusively concave to the front, between two elements made of materials whose mean refractive indices differ by more than 0.1, preferably by more than 0.15. The radius of curvature of this internal contact preferably lies between $0.25 f_{A2}$ and $0.75 f_{A2}$ numerically, preferably between $0.37 f_{A2}$ and $0.57 f_{A2}$.

In order to achieve general stability of the various aberrations throughout the focusing range, the rear part may conveniently comprise a doublet component spaced in front of a dispersive simple component, the front surface of the doublet component and the front surface of the simple component both being concave to the front in some instances, and in any event the radius of the former surface being numerically greater than $0.8 f_{A2}$, preferably numerically greater than $1.1 f_{A2}$. This radius is thus numerically greater than the radius of the front surface of the simple component, which may lie between $0.3 f_{A2}$ and $f_{A2}$, preferably between $0.5 f_{A2}$ and $0.8 f_{A2}$.

While the further feature above-mentioned are also generally applicable to any modern zoom lens having a divergent front member, it will be appreciated that within the framework provided by said features, specific values for the individual parameters of the front member can only be determined in relation to the other parameters of a particular construction of complete zoom lens to which the invention is applied, that is to say, in relation to the parameters of the members of the front assembly which are movable for zooming behind the front member. Accordingly, the front member according to the present invention will now be exemplified with reference to its application to a particular optical objective of the zoom type having a wide range of variation of focal length, a wide angular field of view at minimum equivalent focal length, and an acceptable law of relative movement for the zooming members. In addition, this zoom lens is inherently suited to the use of a divergent front member capable of providing focusing down to very short object distances, so that particularly advantageous results are thereby achieved. The zoom lens in question comprises a stationary rear assembly and a front assembly consisting of a divergent front member stationary with respect to zooming and second, third and fourth members which are respectively convergent, divergent and convergent, the second and fourth members simultaneously moving forward for zooming toward maximum focal length in association with rearward movement of the third member. The objective is characterized by the following features in combination:

a. $2.5 Fm/N > f_2 > f_4 > f_3 > 1$
b. $1.5 \sqrt{R} > g_3 > g_4 > g_2 > 1$, where $Fm$ is the maximum value of the equivalent focal length of the complete objective; $N$ is the $f$-number of the objective; $f_2$, $f_3$ and $f_4$ are respectively the equivalent focal lengths of the second, third and fourth members; $g_2$, $g_3$ and $g_4$ are respectively the ratios between maximum and minimum magnifications of the second, third and fourth members; and R is the ratio of the maximum to minimum focal lengths of the complete objective.

An optical objective of this basic construction forms the subject of our U.S. Application Ser. No. 99,527, filed Dec. 18, 1970, and eleven practical examples in accordance with the basic construction are tabulated therein.

In said objective of the basic construction in question, in order to facilitate focusing down to very short distances, by use of the front member according to the present invention, $F_A$ preferably lies between $f_2$ and $1.5 f_2$, more specifically between $1.1 f_2$ and $1.3 f_2$.

DESCRIPTION OF EMBODIMENTS

Nine examples of practical objective in accordance with the invention will now be described with further reference to the accompanying drawings, in which:

FIG. 5 shows a further example of corrected zoom lens, again with the members movable for zooming in the position of minimum focal length $F_0$ and the rear part of the front member focused for infinity;

FIG. 8 is a corresponding view applicable to a sixth example; and

FIG. 9 is a corresponding view applicable to eighth and ninth examples.

Figure 1A:
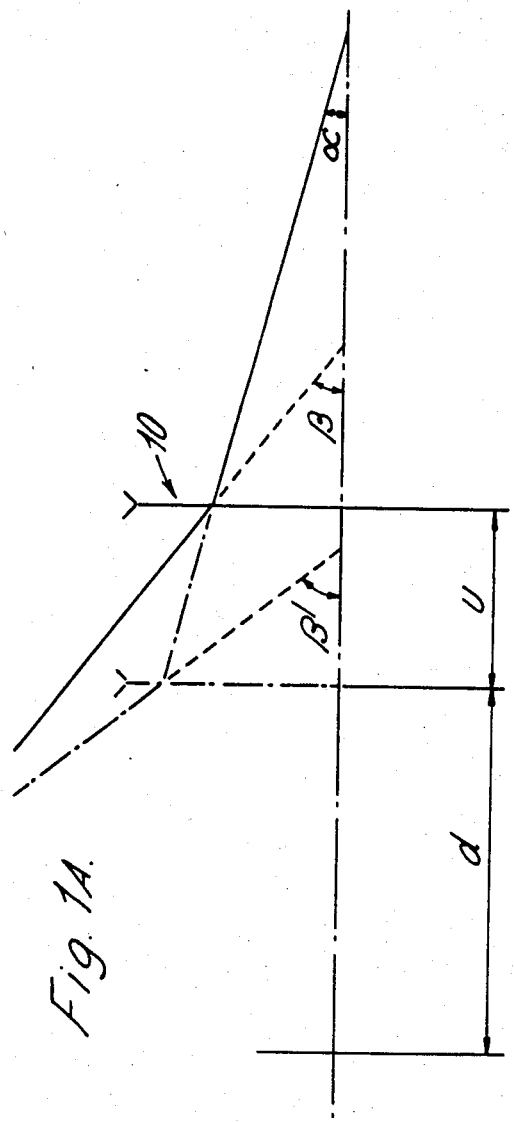
Figure 2B:
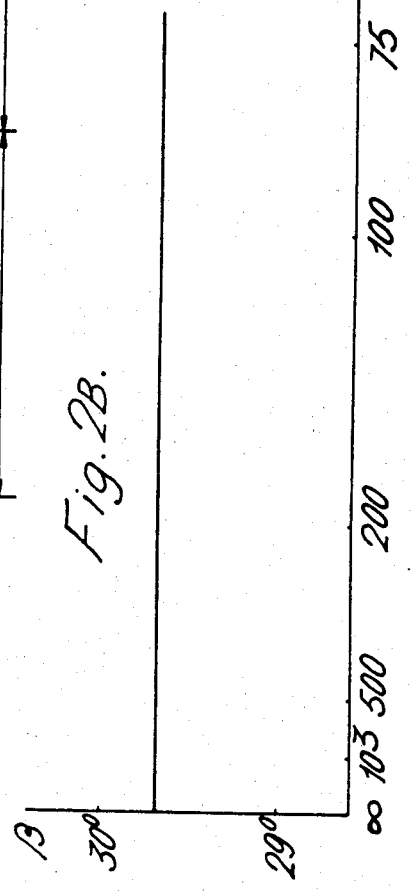
Figure 1B:
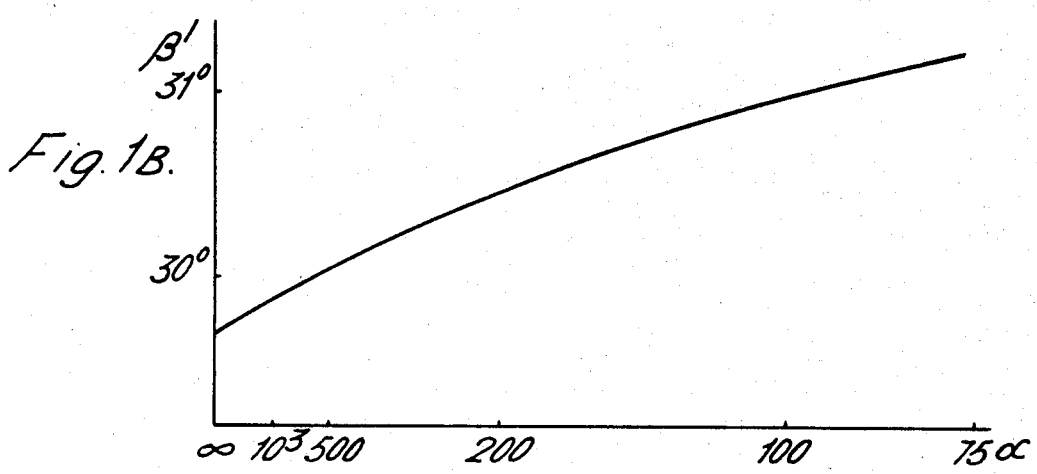
Figure 2A:
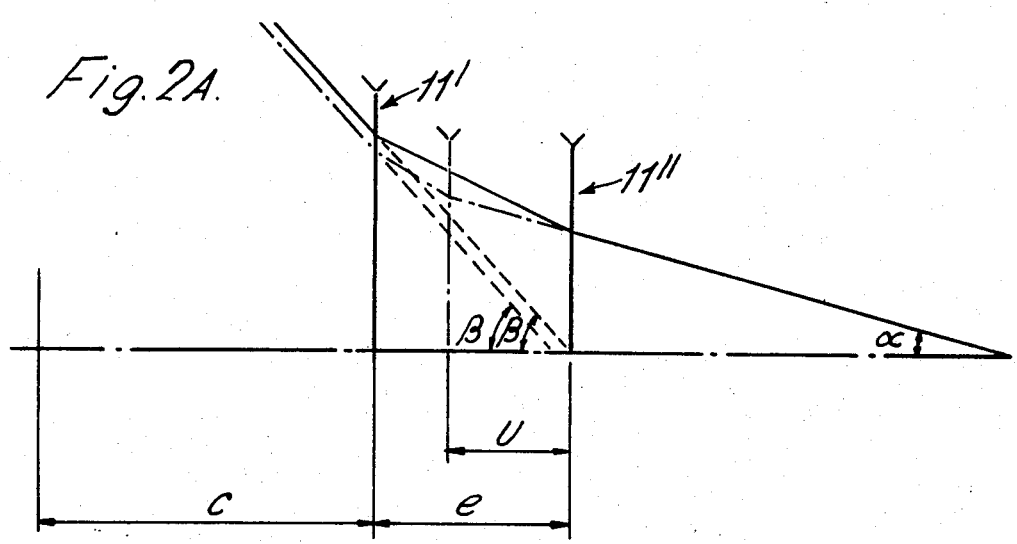
Figure 4:
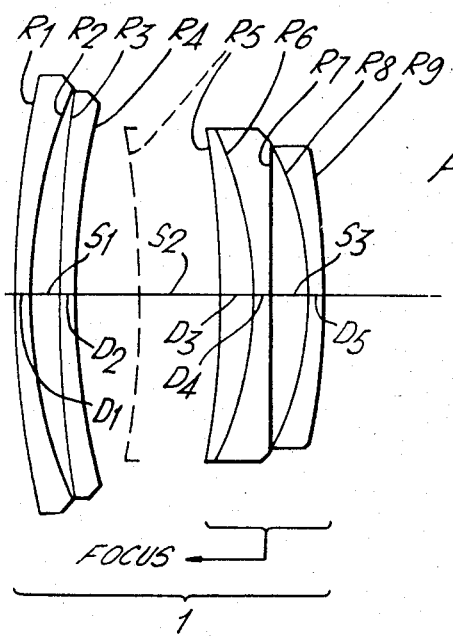
FIG. 4 shows a modified front member providing a second example of corrected zoom lens.
Figure 3:
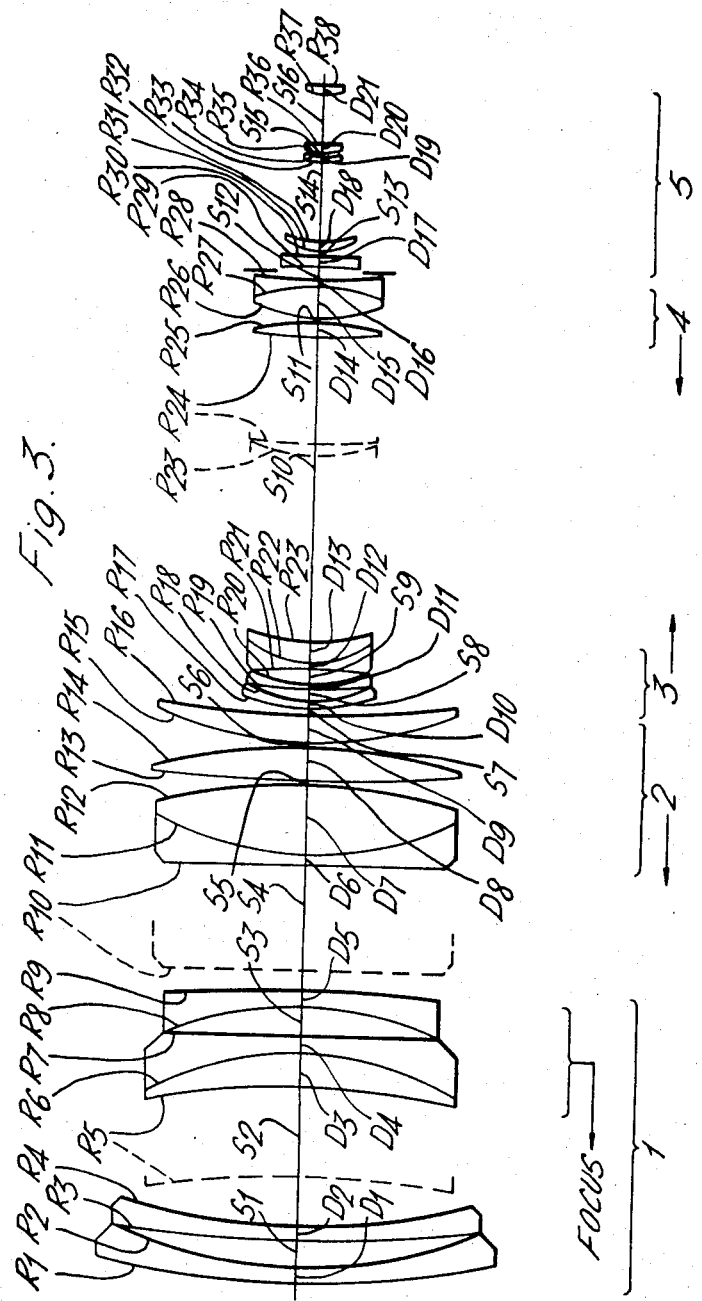
FIG. 3 shows one example of corrected zone lens with the members movable for zooming in the position of minimum focal length $F_0$ and the rear part of the front member focused for infinity.
Figure 6:
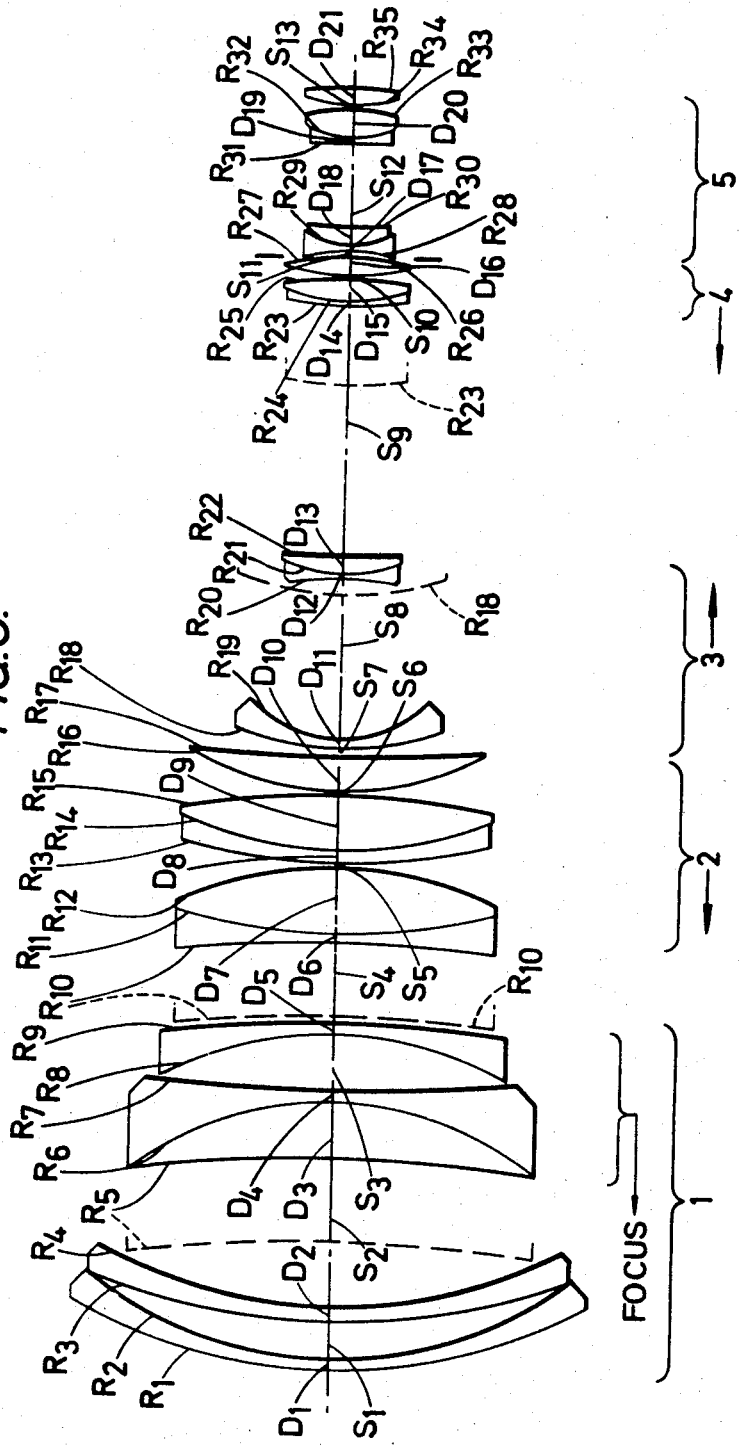
FIG. 6 is a corresponding view applicable to fourth and seventh examples.
Figure 7:
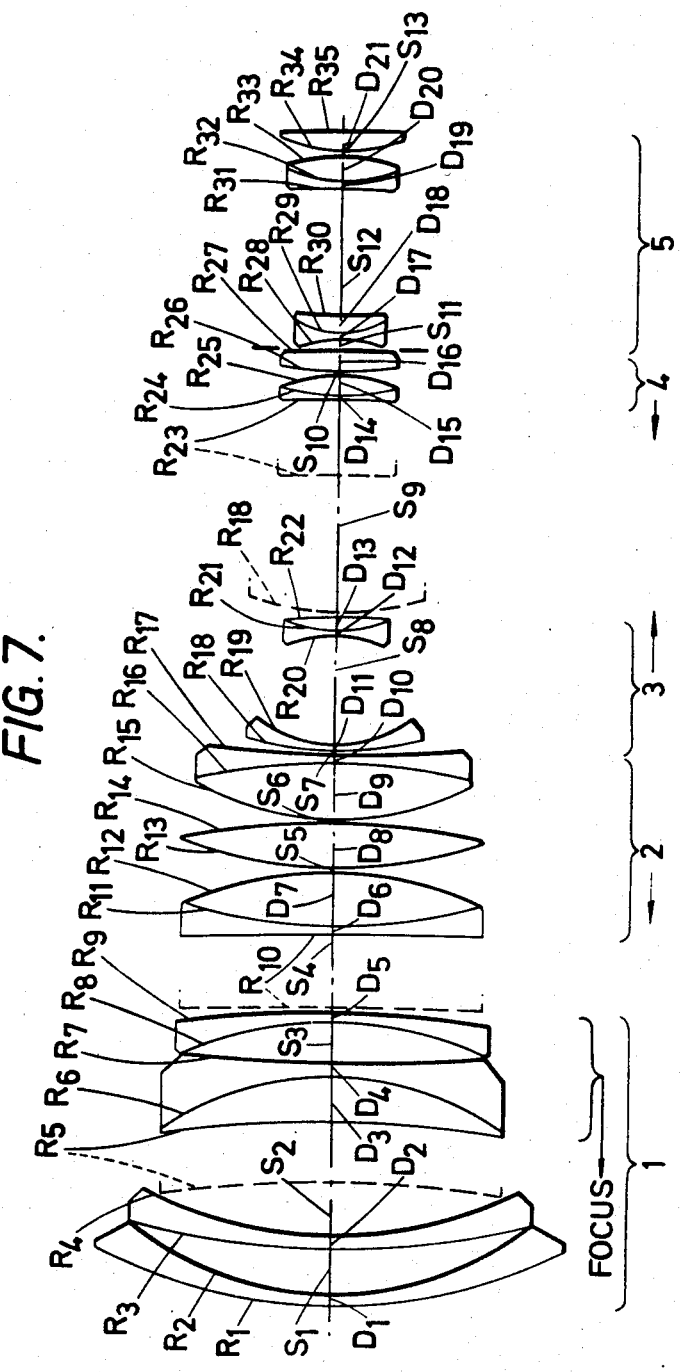
FIG. 7 is a corresponding view applicable to a fifth example.

Although each example of each of the groups constituted by a fourth and seventh examples, and the eighth and ninth examples constitutes a substantially independent design, the numbers of elements and parameters involved are similar, and the differences in the values of said parameters, from one example to the other within each group, is not sufficient materially to affect the appearance of the objective on the scale to which it is drawn.

Numerical data for these nine convenient practical examples of zoom objective according to the invention are given in the following Tables 1 to 9, in which $R_1$, $R_2$ .... designate the radii of curvature of the individual surfaces counting from the front, the positive sign indicating that the surface is convex to the front and the negative sign that it is concave thereto; $D_1$ $D_2$ .... designate the axial thicknesses of the individual elements; and $S_1$ $S_2$ .... designate the axial air separations between the components of the objective. The tables also give the mean refractive indices $n$ for the $d$ line of the spectrum and the Abbe V numbers of the materials of which the various elements of the objective are made, and in addition the clear diameters of the various surfaces.

Since each zoom lens includes three movable members in the front assembly, four variable air separations are involved; these are specified in the second section of each table. The values of the variable air separations are given, assuming the objective to be focused for infinity (since focusing movement of the front member affects the first of such variable air separations), for a number of zooming positions designated in terms of the equivalent focal length F of the complete objective as this varies from the minimum value $Fo$ to the maximum value $Fm$.

The third section of each table for the first two examples give the equation defining an axial section through an aspheric surface provided in the stationary rear member of the objective.

Finally, the fourth section of each table for the first two examples and the third section for the remaining examples gives, for each of a set of representative values of the distance d of the object in front of the surface $R_1$, the variations $\Delta S_2$ and $\Delta S_4$, from the values of $S_2$ and $S_4$ given in the first and second sections of the table due to focusing movement of the rear part of the front member to suit such object distances.

TABLE 1 — Fo = 1

| Radius | | Thickness or Air Separation | Refractive Index $n_d$ | Abbe V Number | Clear diameter |
|---|---|---|---|---|---|
| $R_1$+23.333 | | | | | 10.400 |
| | $D_1$ | .333 | 1.64050 | 60.10 | |
| $R_2$+12.000 | | | | | 9.667 |
| | $S_1$ | .720 | | | |
| $R_3$+33.333 | | | | | 9.613 |
| | $D_2$ | .333 | 1.64050 | 60.10 | |
| $R_4$+17.133 | | | | | 9.180 |
| | $S_2$ | 3.4667 (variable) | | | |
| $R_5$−20.667 | | | | | 8.000 |
| | $D_3$ | .867 | 1.80518 | 25.43 | |
| $R_6$−8.333 | | | | | 7.933 |
| | $D_4$ | .333 | 1.58904 | 53.01 | |
| $R_7$ ∞ | | | | | 7.307 |
| | $S_3$ | .820 | | | |
| $R_8$−9.200 | | | | | 7.233 |
| | $D_5$ | .333 | 1.46450 | 65.77 | |
| $R_9$−72.788 | | | | | 7.113 |
| | $S_4$ | variable | | | |
| $R_{10}$ ∞ | | | | | 7.333 |
| | $D_6$ | 0.267 | 1.80518 | 24.43 | |
| $R_{11}$+8.667 | | | | | 7.700 |
| | $D_7$ | 1.733 | 1.69680 | 56.18 | |
| $R_{12}$−14.667 | | | | | 7.800 |
| | $S_5$ | 0.00667 | | | |
| $R_{13}$+46.133 | | | | | 8.000 |
| | $D_8$ | 0.900 | 1.69680 | 56.18 | |
| $R_{14}$−14.533 | | | | | 8.000 |
| | $S_6$ | 0.00667 | | | |
| $R_{15}$+10.000 | | | | | 7.800 |
| | $D_9$ | 0.733 | 1.64050 | 60.10 | |
| $R_{16}$+33.681 | | | | | 7.733 |
| | $S_7$ | variable | | | |
| $R_{17}$+5.180 | | | | | 3.367 |
| $R_{18}$+3.100 | | | | | 3.167 |
| | $D_{10}$ | 0.133 | 1.72000 | 50.41 | |
| $R_{19}$+10.413 | | | | | 3.167 |
| | $S_8$ | 0.320 | | | |
| $R_{20}$+3.933 | | | | | 3.100 |
| | $D_{11}$ | 0.133 | 1.72000 | 50.41 | |
| $R_{21}$−19.160 | | | | | 3.133 |
| | $S_9$ | 0.400 | | | |
| $R_{22}$+2.493 | | | | | 3.233 |
| | $D_{12}$ | 0.100 | 1.56873 | 63.08 | |
| $R_{23}$+5.026 | | | | | 3.233 |
| | $D_{13}$ | 0.500 | 1.80518 | 25.43 | |
| $R_{24}$+2.3733 | | | | | 3.267 |
| | $S_{10}$ | variable | | | |
| $R_{25}$−7.193 | | | | | 3.300 |
| | $D_{14}$ | 0.400 | 1.68900 | 49.48 | |
| $R_{26}$+3.907 | | | | | 3.300 |
| | $S_{11}$ | 0.00667 | | | |
| $R_{27}$−4.667 | | | | | 3.300 |
| | $D_{15}$ | 0.800 | 1.69680 | 56.18 | |
| $R_{28}$+17.719 | | | | | 3.133 |
| | $D_{16}$ | 0.133 | 1.80518 | 25.43 | |
| $R_{29}$−13.811 (Aspheric) | | $S_{12}$ | variable | | 2.0067 |
| $R_{30}$+46.1361 | | | | | 1.9607 |
| | $D_{17}$ | 0.2370 | 1.69680 | 56.18 | |
| $R_{31}$+1.5005 | | | | | 1.8487 |
| | $S_{13}$ | 0.1351 | | | |
| $R_{32}$+1.6853 | | | | | 1.7667 |
| | $D_{18}$ | 0.1952 | 1.50137 | 56.41 | |
| $R_{33}$+2.4208 | | | | | 1.3264 |
| | $S_{14}$ | 1.9911 | | | |
| $R_{34}$+1.2148 | | | | | 1.2874 |
| | $D_{19}$ | 0.1311 | 1.69680 | 56.18 | |
| $R_{35}$+2.0232 | | | | | 1.2992 |
| | $S_{15}$ | 0.0953 | | | |
| $R_{36}$+67.4082 | | | | | 1.3250 |
| | $D_{20}$ | 0.2469 | 1.48606 | 81.49 | |
| $R_{37}$+1.2707 | | | | | 1.7440 |
| | $S_{16}$ | 1.1463 | | | |
| $R_{38}$+5.3732 5.3731 | | | | | 1.6841 |
| | $D_{21}$ | 0.4241 | 1.48606 | 81.49 | |

Thick Lens Separations during Zooming with Object at Infinity

| F | $S_4$ | $S_7$ | $S_{10}$ | $S_{12}$ |
|---|---|---|---|---|
| 1.000 | 3.0896 | 0.0706 | 7.6576 | 0.2755 |
| 1.525 | 2.7078 | 1.7290 | 5.9992 | 0.6573 |
| 3.075 | 1.9574 | 4.0622 | 3.6658 | 1.4075 |
| 3.588 | 1.7736 | 4.5290 | 3.1992 | 1.5915 |
| 5.952 | 1.1290 | 5.9956 | 1.7324 | 2.2359 |
| 8.070 | .7182 | 6.8624 | 0.8658 | 2.6469 |
| 10.000 | .4182 | 7.4780 | 0.2500 | 2.9467 |

Equation for aspheric surface $R_{29}$:

where $$A_2 = 0.3989925 \times 10^{-2}$$

$$A_4 = -0.42625912 \times 10^{-3}$$

$$A_6 = -0.63682097 \times 10^{-3}$$

$$A_8 = -0.14074694 \times 10^{-2}$$

$$A_{10} = 0.11075916 \times 10^{-2}$$

Thick Lens Separations during Focusing

| | | |
|---|---|---|
| ∞ | 0 | 0 |
| 64.4 $F_o$ | −1.2667 | +1.2667 |
| 41.7 $F_o$ | −1.8667 | +1.8667 |
| 30.2 $F_o$ | −2.4667 | +2.4667 |

Table 2 — Fo = 1.0

| Radius | Thickness or Air Separation | | Refractive Index $n_d$ | Abbe V Number | Clear Diameter |
|---|---|---|---|---|---|
| $R_1$+24.2554 | | | | | 10.4 |
| | $D_1$ | .314 | 1.6405 | 60.1 | |
| $R_2$+12.5116 | | | | | 9.666 |
| | $S_1$ | .692 | | | |
| $R_3$−34.7468 | | | | | 9.613 |
| | $D_2$ | .314 | 1.6405 | 60.1 | |
| $R_4$−17.86115 | | | | | 9.18 |
| | $S_2$ | 3.4992 (variable) | | | |
| $R_5$−21.5429 | | | | | 8.0 |
| | $D_3$ | .818 | 1.80518 | 25.43 | |
| $R_6$−8.672 | | | | | 7.933 |
| | $D_4$ | .315 | 1.58913 | 61.27 | |
| $R_7$ ∞ | | | | | 7.307 |
| | $S_3$ | .913 | | | |
| $R_8$−7.666 | | | | | 7.233 |
| | $D_5$ | .315 | 1.6405 | 60.1 | |
| $R_9$−17.567 | | | | | 7.113 |
| | $S_4$ | variable | | | |
| $R_{10}$ ∞ | | | | | 7.333 |
| | $D_6$ | .267 | 1.80518 | 25.43 | |
| $R_{11}$−8.667 | | | | | 7.700 |
| | $D_7$ | 1.733 | 1.69680 | 56.18 | |
| $R_{12}$−14.667 | | | | | 7.800 |
| | $S_5$ | .00667 | | | |
| $R_{13}$+46.133 | | | | | 8.000 |
| | $D_8$ | .900 | 1.69680 | 56.18 | |
| $R_{14}$−14.533 | | | | | 8.000 |
| | $S_6$ | .00667 | | | |
| $R_{15}$+10.000 | | | | | 7.800 |
| | $D_9$ | .733 | 1.64050 | 60.10 | |
| $R_{16}$+33.681 | | | | | 7.733 |
| | $S_7$ | variable | | | |
| $R_{17}$+5.180 | | | | | 3.367 |
| | $D_{10}$ | .133 | 1.72000 | 50.41 | |
| $R_{18}$+3.100 | | | | | 3.167 |
| | $S_8$ | .320 | | | |
| $R_{19}$+10.413 | | | | | 3.167 |
| | $D_{11}$ | .133 | 1.7200 | 50.41 | |
| $R_{20}$+3.933 | | | | | 3.100 |
| | $S_9$ | .400 | | | |
| $R_{21}$−19.160 | | | | | 3.133 |
| | $D_{12}$ | .100 | 1.56873 | 63.08 | |
| $R_{22}$+2.493 | | | | | 3.233 |
| | $D_{13}$ | .500 | 1.80518 | 25.43 | |
| $R_{23}$+5.026 | | | | | 3.233 |
| | $S_{10}$ | variable | | | |
| $R_{24}$+23.733 | | | | | 3.267 |
| | $D_{14}$ | .400 | 1.68900 | 49.48 | |
| $R_{25}$−7.193 | | | | | 3.300 |
| | $S_{11}$ | .00667 | | | |
| $R_{26}$+3.907 | | | | | 3.300 |
| | $D_{15}$ | .800 | 1.689680 | 56.18 | |
| $R_{27}$−4.667 | | | | | 3.300 |
| | $D_{16}$ | .133 | 1.80518 | 25.43 | |
| $R_{28}$+17.719 | | | | | 3.133 |
| | $S_{12}$ | variable | | | |
| $R_{29}$−13.811 | | | | | 2.007 |
| (Aspheric) | | | | | |
| | $D_{17}$ | .237 | 1.689680 | 56.18 | |
| $R_{30}$+46.136 | | | | | 1.961 |
| | $S_{13}$ | .135 | | | |
| $R_{31}$+1.500 | | | | | 1.849 |
| | $D_{18}$ | .195 | 1.50137 | 56.41 | |
| $R_{32}$+1.685 | | | | | 1.767 |
| | $S_{14}$ | 1.991 | | | |
| $R_{33}$+2.421 | | | | | 1.326 |
| | $D_{19}$ | .131 | 1.69680 | 56.18 | |
| $R_{34}$+1.215 | | | | | 1.287 |
| | $S_{15}$ | .095 | | | |
| $R_{35}$+2.023 | | | | | 1.299 |
| | $D_{20}$ | .247 | 1.48606 | 81.49 | |
| $R_{36}$+67.408 | | | | | 1.325 |
| | $S_{16}$ | 1.146 | | | |
| $R_{37}$+1.271 | | | | | 1.744 |
| | $D_{21}$ | .424 | 1.48606 | 81.49 | |
| $R_{38}$+5.373 | | | | | 1.684 |

Thick Lens Separations during Zooming with Object at Infinity

| F | $S_4$ | $S_7$ | $S_{10}$ | $S_{12}$ |
|---|---|---|---|---|
| 1.000 | 3.1395 | 0.0706 | 7.6575 | 0.2755 |
| 1.525 | 2.7550 | 1.7290 | 5.9992 | 0.6573 |
| 3.075 | 2.0031 | 4.0622 | 3.6658 | 1.4075 |
| 3.588 | 1.8191 | | 3.1992 | 1.5915 |
| 5.952 | 1.1743 | 5.9956 | 1.7324 | 2.2359 |
| 8.070 | .7633 | 6.8624 | 0.8658 | 2.6469 |
| 10.000 | .4634 | 7.4780 | 0.2500 | 2.9467 |

Equation for aspheric surface $R_{29}$:

where $$A_2 = 0.3989925 \times 10^{-2}$$

$$A_4 = -0.42625912 \times 10^{-3}$$

$$A_6 = -0.63682097 \times 10^{-3}$$

$$A_8 = -0.14074694 \times 10^{-2}$$

$$A_{10} = 0.11075916 \times 10^{-2}$$

Thick Lens Separations during Focusing

| ∞ | 0 | 0 |
|---|---|---|
| 64.4 $F_o$ | −1.2442 | +1.2442 |
| 41.7 $F_o$ | −1.8342 | +1.8342 |
| 30.2 $F_o$ | −2.4192 | +2.4192 |

Table 3 — Fo = 1.0

| Radius | Thickness or Air Separation | | Refractive Index $n_d$ | Abbe V Number | Clear Diameter |
|---|---|---|---|---|---|
| $R_1$+10.712 | | | | | 10.400 |
| | $D_1$ | .312 | 1.68900 | 49.50 | |
| $R_2$+7.912 | | | | | 9.631 |
| | $S_1$ | .769 | | | |
| $R_3$+13.500 | | | | | 9.606 |
| | $D_2$ | .313 | 1.68900 | 49.50 | |
| $R_4$+9.319 | | | | | 9.025 |
| | $S_2$ | 2.787 | | | |
| $R_5$−26.187 | | | | | 8.125 |
| | $D_3$ | 1.200 | 1.80518 | 25.43 | |
| $R_6$−6.619 | | | | | 8.125 |
| | $D_4$ | .312 | 1.62041 | 60.33 | |
| $R_7$+39.431 | | | | | 7.000 |
| | $S_3$ | 1.075 | | | |
| $R_8$−7.212 | | | | | 6.975 |
| | $D_5$ | .250 | 1.72000 | 50.41 | |
| $R_9$−21.106 | | | | | 7.019 |
| | $S_4$ | variable | | | |
| $R_{10}$−34.669 | | | | | 6.881 |
| | $D_6$ | .250 | 1.80518 | 25.43 | |
| $R_{11}$+18.819 | | | | | 7.087 |
| | $D_7$ | 1.212 | 1.55963 | 61.21 | |
| $R_{12}$−8.694 | | | | | 7.175 |
| | $S_5$ | .006 | | | |
| $R_{13}$+21.356 | | | | | 7.500 |
| | $D_8$ | .250 | 1.80518 | 25.43 | |
| $R_{14}$+10.006 | | | | | 7.506 |
| | $D_9$ | 1.331 | 1.62041 | 60.33 | |
| $R_{15}$−16.069 | | | | | 7.525 |
| | $S_6$ | .006 | | | |
| $R_{16}$+9.756 | | | | | 7.493 |
| | $D_{10}$ | 1.019 | 1.64050 | 60.10 | |
| $R_{17}$−85.937 | | | | | 7.437 |
| | $S_7$ | variable | | | |
| $R_{18}$+9.544 | | | | | 4.187 |
| | $D_{11}$ | .125 | 1.73350 | 51.65 | |
| $R_{19}$+3.456 | | | | | 3.769 |
| | $S_8$ | 2.488 | | | |
| $R_{20}$−4.331 | | | | | 2.788 |
| | $D_{12}$ | .125 | 1.73350 | 51.65 | |
| $R_{21}$+3.956 | | | | | 2.962 |
| | $D_{13}$ | .481 | 1.76180 | 26.95 | |
| $R_{22}$−33.401 | | | | | 2.988 |
| | $S_9$ | variable | | | |
| $R_{23}$+13.144 | | | | | 3.094 |
| | $D_{14}$ | .125 | 1.80518 | 25.43 | |
| $R_{24}$+6.075 | | | | | 3.112 |
| | $D_{15}$ | .562 | 1.53996 | 59.71 | |

| Radius | | | |
|---|---|---|---|
| $R_{25}$ −6.150 | | | |
| | $S_{10}$ .006 | | |
| $R_{26}$ +7.219 | | | |
| | $D_{16}$ .388 | 1.55232 | 63.46 |
| $R_{27}$ −19.887 | | | |
| | $S_{11}$ variable | | |
| $R_{28}$ −4.687 | | | |
| | $D_{17}$ .125 | 1.62606 | 38.96 |
| $R_{29}$ +2.459 | | | |
| | $D_{18}$ .344 | 1.78470 | 26.08 |
| $R_{30}$ +22.385 | | | |
| | $S_{12}$ 2.625 | | |
| $R_{31}$ ∞ | | | |
| | $D_{19}$ .125 | 1.78470 | 26.08 |
| $R_{32}$ +2.782 | | | |
| | $D_{20}$ .469 | 1.51742 | 52.20 |
| $R_{33}$ −4.042 | | | |
| | $S_{13}$ .006 | | |
| $R_{34}$ +3.938 | | | |
| | $D_{21}$ .281 | 1.51680 | 64.17 |
| $R_{35}$ −16.392 | | | |

This objective is corrected for use with a prism of thickness 4.2 Fo in the rear conjugate, said prism having a refractive index of 1.5168 and an Abbe V number of 64.17.

Thick Lens Separations during Zooming with Object at Infinity

| $F_1$ | $S_4$ | $S_7$ | $S_9$ | $S_{11}$ |
|---|---|---|---|---|
| 1.000 | 2.4405 | .1842 | 8.2807 | .3466 |
| 1.660 | 1.9793 | 2.2124 | 6.2526 | .8078 |
| 2.950 | 1.4027 | 4.2356 | 4.2293 | 1.3844 |
| 5.450 | .7424 | 6.2515 | 2.2134 | 2.0447 |
| 10.000 | .0692 | 8.2820 | .1829 | 2.7179 |

Thick Lens Separations during Focusing

| | | |
|---|---|---|
| ∞ | 0 | 0 |
| 62.5 | −.7390 | +.7390 |
| 37.5 | −1.1573 | +1.1573 |
| 28.1 | −1.4726 | +1.4726 |

Table 4 — Fo = 1.0

| Radius | Thickness or Air Separation | Refractive Index $n_d$ | Abbe V Number | Clear Diameter |
|---|---|---|---|---|
| $R_1$ +7.540 | | | | 7.27 |
| | $D_1$ .200 | 1.68900 | 49.48 | |
| $R_2$ +5.570 | | | | 6.75 |
| | $S_1$ .540 | | | |
| $R_3$ +10.230 | | | | 6.77 |
| | $D_2$ .200 | 1.68900 | 49.48 | |
| $R_4$ +6.890 | | | | 6.39 |
| | $S_2$ 2.000 | | | |
| $R_5$ −18.430 | | | | 5.65 |
| | $D_3$ .810 | 1.80518 | 25.43 | |
| $R_6$ −4.655 | | | | 5.65 |
| | $D_4$ .200 | 1.62041 | 60.33 | |
| $R_7$ +27.750 | | | | 5.25 |
| | $S_3$ .785 | | | |
| $R_8$ − | | | | 4.90 |
| | $D_5$ .200 | 1.72000 | 50.41 | |
| $R_9$ −14.760 | | | | 4.90 |
| | $S_4$ variable | | | |
| $R_{10}$ −26.335 | | | | 4.54 |
| | $D_6$ .200 | 1.80518 | 25.43 | |
| $R_{11}$ +9.575 | | | | 4.54 |
| | $D_7$ .900 | 1.51011 | 64.24 | |
| $R_{12}$ −4.970 | | | | 4.54 |
| | $S_5$ .005 | | | |
| $R_{13}$ +8.825 | | | | 4.39 |
| | $D_8$ .200 | 1.80518 | 25.43 | |
| $R_{14}$ +5.360 | | | | 4.36 |
| | $D_9$ .750 | 1.55963 | 61.21 | |
| $R_{15}$ −11.800 | | | | 4.36 |
| | $S_6$ .005 | | | |
| $R_{16}$ +4.250 | | | | 4.22 |
| | $D_{10}$ .500 | 1.58913 | 61.27 | |
| $R_{17}$ +24.984 | | | | 4.21 |
| | $S_7$ variable | | | |
| $R_{18}$ +4.781 | | | | 3.137 |
| $R_{19}$ +1.778 | | | | 3.137 |
| $R_{20}$ −4.500 | | | | 3.137 |
| $R_{21}$ +2.143 | | | | 2.217 |
| $R_{22}$ +22.202 | | | | 2.212 |
| $R_{23}$ +5.015 | | | | 2.200 |
| $R_{24}$ +2.550 | | | | 1.944 |
| $R_{25}$ −5.780 | | | | 1.979 |
| $R_{26}$ +5.718 | | | | 2.025 |
| $R_{27}$ −5.677 | | | | 2.069 |
| $R_{28}$ −2.574 | | | | 2.069 |
| $R_{29}$ +1.180 | | | | |
| $R_{30}$ +7.936 | | | | |
| $R_{31}$ ∞ | | | | |
| $R_{32}$ +1.504 | | | | |
| $R_{33}$ −2.825 | | | | |
| $R_{34}$ +2.606 | | | | |
| $R_{35}$ −21.159 | | | | |

| Radius | Thickness or Air Separation | Refractive Index | Abbe V Number | Clear Diameter |
|---|---|---|---|---|
| | $D_{11}$ .080 | 1.73520 | 41.59 | 2.91 |
| | $S_8$ 2.200 | | | 2.51 |
| | $D_{12}$ .080 | 1.73350 | 51.65 | 1.64 |
| | $D_{13}$ .250 | 1.80518 | 25.43 | 1.70 |
| | $S_9$ variable | | | 1.70 |
| | $D_{14}$ .060 | 1.80518 | 25.43 | 1.75 |
| | $D_{15}$ .320 | 1.60311 | 60.60 | 1.75 |
| | $S_{10}$ .005 | | | 1.76 |
| | $D_{16}$ .215 | 1.60311 | 60.60 | 1.76 |
| | $S_{11}$ variable | | | 1.77 |
| | $D_{17}$ .100 | 1.62606 | 38.96 | 1.28 |
| | $D_{18}$ .275 | 1.78470 | 26.08 | 1.27 |
| | $S_{12}$ 1.100 | | | 1.25 |
| | $D_{19}$ .100 | 1.78470 | 26.08 | 1.20 |
| | $D_{20}$ .375 | 1.51742 | 52.20 | 1.25 |
| | $S_{13}$ .005 | | | 1.31 |
| | $D_{21}$ .225 | 1.51823 | 58.98 | 1.36 |
| | | | | 1.37 |

Thick Lens Separations during Zooming with Object at Infinity

| F | $S_4$ | $S_7$ | $S_9$ | $S_{11}$ |
|---|---|---|---|---|
| 1.0 | 1.0299 | .1060 | 3.3516 | .0776 |
| 1.425 | .8375 | .9234 | 2.5342 | .2700 |
| 2.110 | .6039 | 1.7431 | 1.7144 | .5037 |
| 3.220 | .3304 | 2.5594 | .8982 | .7771 |
| 5.000 | .0260 | 3.3744 | .0832 | 1.0815 |

Thick Lens Separations during Focusing

| | | |
|---|---|---|
| ∞ | 0 | 0 |
| 17.00 | −1.1694 | +1.1694 |

Table 5 — Fo = 1.0

| Radius | Thickness or Air Separation | Refractive Index $n_d$ | Abbe V Number | Clear Diameter |
|---|---|---|---|---|
| $R_1$ +7.321 | | | | 6.32 |
| | $D_1$ .200 | 1.62041 | 60.33 | |
| $R_2$ +4.558 | | | | 5.71 |
| | $S_1$ .650 | | | |
| $R_3$ +11.364 | | | | 5.71 |
| | $D_2$ .200 | 1.62041 | 60.33 | |
| $R_4$ +5.869 | | | | 5.32 |
| | $S_2$ 1.575 | | | |
| $R_5$ −15.385 | | | | 4.88 |
| | $D_3$ .635 | 1.80518 | 25.43 | |
| $R_6$ −4.273 | | | | 4.87 |
| | $D_4$ .200 | 1.62280 | 56.90 | |
| $R_7$ +31.446 | | | | 4.39 |
| | $S_3$ .550 | | | |
| $R_8$ −5.181 | | | | 4.40 |
| | $D_5$ .150 | 1.69100 | 54.78 | |
| $R_9$ −17.653 | | | | 4.43 |
| | $S_4$ variable | | | |
| $R_{10}$ −109.890 | | | | 4.25 |
| | $D_6$ .165 | 1.80518 | 25.43 | |
| $R_{11}$ +7.416 | | | | 4.25 |
| | $D_7$ .750 | 1.51821 | 65.05 | |
| $R_{12}$ −5.199 | | | | 4.25 |
| | $S_5$ .005 | | | |
| $R_{13}$ +6.630 | | | | 4.26 |
| | $D_8$ .600 | 1.69100 | 54.78 | |
| $R_{14}$ −11.161 | | | | 4.28 |
| | $S_6$ .005 | | | |
| $R_{15}$ +4.199 | | | | 3.95 |
| | $D_9$ .750 | 1.64050 | 60.10 | |

| Radius | Thickness or Air Separation | Refractive Index $n_d$ | Abbe V Number | Clear Diameter |
|---|---|---|---|---|
| $R_{16}$ −11.431 | | | | 3.89 |
| | $D_{10}$ .165 | 1.80518 | 25.43 | |
| $R_{17}$ +14.251 | | | | 3.65 |
| | $S_7$ variable | | | |
| $R_{18}$ +5.247 | | | | 2.49 |
| | $D_{11}$ .070 | 1.74400 | 44.77 | |
| $R_{19}$ +1.727 | | | | 2.18 |
| | $S_8$ 1.459 | | | |
| $R_{20}$ −1.791 | | | | 1.35 |
| | $D_{12}$ .070 | 1.74400 | 44.77 | |
| $R_{21}$ +1.887 | | | | 1.47 |
| | $D_{13}$ .200 | 1.80518 | 25.43 | |
| $R_{22}$ −6.891 | | | | 1.48 |
| | $S_9$ variable | | | |
| $R_{23}$ −25.628 | | | | 1.61 |
| | $D_{14}$ .060 | 1.80518 | 25.43 | |
| $R_{24}$ +3.207 | | | | 1.65 |
| | $D_{15}$ .265 | 1.64328 | 47.96 | |
| $R_{25}$ −2.245 | | | | 1.66 |
| | $S_{10}$ .005 | | | 1.66 |
| $R_{26}$ +5.270 | | | | 1.67 |
| | $D_{16}$ .265 | 1.51680 | 64.17 | |
| $R_{27}$ −4.676 | | | | 1.64 |
| | $S_{11}$ variable | | | |
| $R_{28}$ −1.799 | | | | 1.19 |
| | $D_{17}$ .100 | 1.62606 | 38.96 | |
| $R_{29}$ +1.161 | | | | 1.22 |
| | $D_{18}$ .275 | 1.80518 | 25.43 | |
| $R_{30}$ +10.272 | | | | 1.21 |
| | $S_{12}$ 1.693 | | | |
| $R_{31}$ −21.570 | | | | 1.47 |
| | $D_{19}$ .100 | 1.80518 | 25.43 | |
| $R_{32}$ +1.939 | | | | 1.53 |
| | $D_{20}$ .375 | 1.48749 | 70.41 | |
| $R_{33}$ −2.604 | | | | 1.58 |
| | $S_{13}$ .005 | | | |
| $R_{34}$ +2.302 | | | | 1.71 |
| | $D_{21}$ .240 | 1.57099 | 50.88 | |
| $R_{35}$ −16.203 | | | | 1.71 |

Thick Lens Separating during Zooming with Object at Infinity

| F | $S_4$ | $S_7$ | $S_9$ | $S_{11}$ |
|---|---|---|---|---|
| 1.0 | 1.0128 | −.0157 | 2.9323 | .1027 |
| 1.425 | .8173 | .6082 | 2.3083 | .2983 |
| 2.110 | .5851 | 1.2448 | 1.6717 | .5305 |
| 3.220 | .3206 | 1.8931 | 1.0235 | .7949 |
| 5.000 | .0345 | 2.5573 | .3593 | 1.0810 |

Thick Lens Separations during Focusing

| ∞ | 0 | 0 |
|---|---|---|
| 17.00 | −.8535 | +.8535 |

Table 6 — Fo = 1

| Radius | Thickness or Air Separation | Refractive Index $n_d$ | Abbe V Number | Clear Diameter |
|---|---|---|---|---|
| $R_1$ +8.547 | | | | 6.10 |
| | $D_1$ .200 | 1.62041 | 60.33 | |
| $R_2$ +4.776 | | | | 5.51 |
| | $S_1$ .680 | | | |
| $R_3$ +15.528 | | | | 5.46 |
| | $D_2$ .200 | 1.62041 | 60.33 | |
| $R_4$ +6.394 | | | | 5.11 |
| | $S_2$ 1.555 | | | |
| $R_5$ −21.834 | | | | 4.57 |
| | $D_3$ .650 | 1.80518 | 25.43 | |
| $R_6$ −4.504 | | | | 4.53 |
| | $D_4$ .200 | 1.61484 | 51.16 | |
| $R_7$ +26.178 | | | | 4.13 |
| | $S_3$ .595 | | | |
| $R_8$ −5.102 | | | | 4.10 |
| | $D_5$ .150 | 1.69100 | 54.78 | |
| $R_9$ −15.814 | | | | 4.10 |
| | $S_4$ variable | | | |
| $R_{10}$ −113.636 | | | | 3.87 |
| | $D_6$ .165 | 1.80518 | 25.43 | |
| $R_{11}$ +7.587 | | | | 3.84 |
| | $D_7$ .865 | 1.51821 | 65.05 | |
| $R_{12}$ −5.429 | | | | 3.86 |
| | $S_5$ .005 | | | |
| $R_{13}$ +6.738 | | | | 4.01 |
| | $D_8$ .610 | 1.69100 | 54.78 | |
| $R_{14}$ −11.525 | | | | 4.00 |
| $R_{15}$ +4.292 | | | | 3.74 |
| | $D_9$ .730 | 1.64328 | 47.96 | |
| $R_{16}$ −11.710 | | | | 3.64 |
| | $D_{10}$ .165 | 1.80518 | 25.43 | |
| $R_{17}$ +13.697 | | | | 3.42 |
| | $S_7$ variable | | | |
| $R_{18}$ +6.000 | | | | 2.18 |
| | $D_{11}$ .070 | 1.73350 | 51.65 | |
| $R_{19}$ +1.718 | | | | 1.92 |
| | $S_8$ 1.310 | | | |
| $R_{20}$ −1.791 | | | | 1.39 |
| | $D_{12}$ .070 | 1.73350 | 51.65 | |
| $R_{21}$ +9.434 | | | | 1.47 |
| | $D_{13}$ .070 | 1.68852 | 30.62 | |
| $R_{22}$ +2.381 | | | | 1.54 |
| | $D_{14}$ .275 | 1.80518 | 25.43 | |
| $R_{23}$ −7.909 | | | | 1.57 |
| | $S_9$ variable | | | |
| $R_{24}$ −25.629 | | | | 1.62 |
| | $D_{15}$ .060 | 1.80518 | 25.43 | |
| $R_{25}$ +3.207 | | | | 1.66 |
| | $D_{16}$ .365 | 1.64050 | 60.10 | |
| $R_{26}$ −2.245 | | | | 1.69 |
| | $S_{10}$ .005 | | | |
| $R_{27}$ +5.270 | | | | 1.70 |
| | $D_{17}$ .215 | 1.51821 | 65.05 | |
| $R_{28}$ −4.752 | | | | 1.70 |
| | $S_{11}$ variable | | | 1.23 |
| $R_{29}$ −1.878 | | | | |
| | $D_{18}$ .070 | 1.62280 | 56.90 | 1.24 |
| $R_{30}$ +1.878 | | | | |
| | $D_{19}$ .275 | 1.76180 | 26.95 | 1.25 |
| R −7.042 | | | | |
| | $S_{12}$ 1.300 | | | 1.19 |
| $R_{32}$ −6.944 | | | | |
| | $D_{20}$ .070 | 1.80518 | 25.43 | 1.23 |
| $R_{33}$ +2.041 | | | | |
| | $D_{21}$ .325 | 1.51821 | 65.05 | 1.28 |
| $R_{34}$ −1.805 | | | | |
| | $S_{13}$ .005 | | | 1.31 |
| $R_{35}$ +76.923 | | | | |
| | $D_{22}$ .240 | 1.51821 | 65.05 | 1.33 |
| $R_{36}$ −3.534 | | | | |

Thick Lens Separations during Zooming with Object at Infinity

| F | $S_4$ | $S_7$ | $S_9$ | $S_{11}$ |
|---|---|---|---|---|
| 1.0 | 1.1559 | .0944 | 2.6237 | .1003 |
| 1.425 | .9477 | .7054 | 2.0127 | .3085 |
| 2.110 | .6997 | 1.3286 | 1.3894 | .5566 |
| 3.220 | .4161 | 1.9632 | .7549 | .8401 |
| 5.000 | .1085 | 2.6132 | .1049 | 1.1477 |

Thick Lens Separations during Focusing

| d | $\Delta S_2$ | $\Delta S_4$ |
|---|---|---|
| ∞ | 0 | 0 |
| 17.00 | −.9085 | +.9085 |

Table 7 — Fo = 1

| Radius | Thickness or Air Separation | Refractive Index $n_d$ | Abbe V Number | Clear Diameter |
|---|---|---|---|---|
| $R_1$ +8.264 | | | | 5.65 |
| | $D_1$ .200 | 1.62041 | 60.33 | |
| $R_2$ +4.682 | | | | 5.12 |
| | $S_1$ .550 | | | |
| $R_3$ +15.528 | | | | 5.12 |
| | $D_2$ .200 | 1.62041 | 60.33 | |
| $R_4$ +6.158 | | | | 4.77 |
| | $S_2$ 1.475 | | | |
| $R_5$ −29.189 | | | | 4.33 |
| | $D_3$ .525 | 1.80518 | 25.43 | |
| $R_6$ −4.505 | | | | 4.31 |
| | $D_4$ .200 | 1.61484 | 51.16 | |
| $R_7$ +19.525 | | | | 3.88 |
| | $S_3$ .475 | | | 3.89 |
| $R_8$ −5.010 | | | | 3.89 |
| | $D_5$ .200 | 1.68900 | 49.48 | |
| $R_9$ −15.521 | | | | 3.88 |
| | $S S_4$ variable | | | |
| $R_{10}$ −161.290 | | | | 3.44 |
| | $D_6$ .165 | 1.80518 | 25.43 | |
| $R_{11}$ +8.000 | | | | 3.45 |
| | $D_7$ .520 | 1.62041 | 60.33 | |
| $R_{12}$ −5.537 | | | | 3.45 |

| Radius | Thickness or Air Separation | | Refractive Index $n_d$ | Abbe V Number |
|---|---|---|---|---|
| $R_{13}$+8.210 | $S_5$ | .005 | | |
| $R_{14}$+3.946 | $D_8$ | .165 | 1.80518 | 25.43 |
| $R_{15}$−17.361 | $D_9$ | .530 | 1.64050 | 60.10 |
| $R_{16}$+3.470 | $S_6$ | .005 | | |
| $R_{17}$+17.304 | $D_{10}$ | .400 | 1.62230 | 53.16 |
| $R_{18}$+4.264 | $S_7$ | variable | | |
| $R_{19}$+1.559 | $D_{11}$ | .070 | 1.73350 | 51.65 |
| $R_{20}$−1.999 | $S_8$ | 1.272 | | |
| $R_{21}$+2.098 | $D_{12}$ | .140 | 1.68900 | 49.48 |
| $R_{22}$−29.940 | $D_{13}$ | .275 | 1.80518 | 15.43 |
| $R_{23}$+22.946 | $S_9$ | variable | | |
| $R_{24}$+2.340 | $D_{14}$ | .060 | 1.80518 | 25.43 |
| $R_{25}$−2.710 | $D_{15}$ | .415 | 1.64050 | 60.10 |
| $R_{26}$+4.154 | $S_{10}$ | .005 | | |
| $R_{27}$−4.018 | $D_{16}$ | .270 | 1.51821 | 65.05 |
| $R_{28}$−1.916 | $S_{11}$ | variable | | |
| $R_{29}$+1.361 | $D_{17}$ | .070 | 1.62299 | 58.06 |
| $R_{30}$+13.301 | $D_{18}$ | .275 | 1.80518 | 25.43 |
| $R_{31}$−5.734 | $S_{12}$ | .955 | | |
| $R_{32}$+2.241 | $D_{19}$ | .070 | 1.80518 | 25.43 |
| $R_{33}$−1.595 | $D_{20}$ | .325 | 1.48749 | 70.41 |
| $R_{34}$+5.239 | $S_{13}$ | .005 | | |
| $R_{35}$−5.494 | $D_{21}$ | .240 | 1.51680 | 64.17 |

Thick Lens Separations during Zooming with Object at Infinity

| F | $S_4$ | $S_7$ | $S_9$ | $S_{11}$ |
|---|---|---|---|---|
| 1.0 | 1.0818 | .1030 | 2.6618 | .1016 |
| 1.425 | .9039 | .7355 | 2.0293 | .2795 |
| 2.110 | .6895 | 1.3740 | 1.3908 | .4939 |
| 3.220 | .4413 | 2.0154 | .7494 | .7421 |
| 5.000 | .1681 | 2.6624 | .1024 | 1.0153 |

Thick Lens Separations during Focusing

| d | $\Delta S_2$ | $\Delta S_4$ |
|---|---|---|
| ∞ | 0 | 0 |
| 17.00 | −.9356 | +.9356 |

Table 8 — Fo = 1

| Radius | Thickness or Air Separation | | Refractive Index $n_d$ | Abbe V Number | Clear Diameter |
|---|---|---|---|---|---|
| $R_1$+7.870 | | | | | 5.68 |
| | $D_1$ | .207 | 1.64050 | 60.10 | |
| $R_2$+4.681 | | | | | 5.15 |
| | $S_1$ | .627 | | | |
| $R_3$+20.150 | | | | | 5.14 |
| | $D_2$ | .207 | 1.64050 | 60.10 | |
| $R_4$+6.534 | | | | | 4.79 |
| | $S_2$ | 1.528 | | | |
| $R_5$−35.098 | | | | | 4.35 |
| | $D_3$ | .518 | 1.80518 | 25.43 | |
| $R_6$−5.028 | | | | | 4.32 |
| | $D_4$ | .207 | 1.58893 | 51.37 | |
| $R_7$+16.895 | | | | | 3.90 |
| | $S_3$ | .502 | | | |
| $R_8$−5.279 | | | | | 3.89 |
| | $D_5$ | .207 | 1.7200 | 50.41 | |
| $R_9$−13.814 | | | | | 3.88 |
| $R_{10}$+152.314 | | | | | 3.42 |
| | $D_6$ | .171 | 1.80518 | 25.43 | |
| $R_{11}$+7.430 | | | | | 3.41 |
| | $D_7$ | .502 | 1.62041 | 60.33 | |
| $R_{12}$−6.886 | | | | | 3.41 |
| | $S_4$ | .005 | | | |
| $R_{13}$+8.448 | | | | | 3.45 |
| | $D_8$ | .171 | 1.80518 | 25.43 | |
| $R_{14}$+4.511 | | | | | 3.42 |
| | $D_9$ | .539 | 1.64050 | 60.10 | |
| $R_{15}$−13.313 | | | | | 3.42 |
| | $S_6$ | .005 | | | |
| $R_{16}$+4.136 | | | | | 3.32 |
| | $D_{10}$ | .378 | 1.64050 | 60.10 | |
| $R_{17}$+26.721 | | | | | 2.19 |
| | $S_7$ | variable | | | |
| $R_{18}$+5.003 | | | | | 1.96 |
| | $D_{11}$ | .073 | 1.78800 | 47.40 | |
| $R_{19}$+1.744 | | | | | 1.53 |
| | $S_8$ | 1.370 | | | |
| $R_{20}$−2.237 | | | | | 1.66 |
| | $D_{12}$ | .073 | 1.71700 | 47.98 | |
| $R_{21}$+2.085 | | | | | 1.68 |
| | $D_{13}$ | .280 | 1.80518 | 25.43 | |
| $R_{22}$−22.925 | | | | | 1.74 |
| | $S_9$ | variable | | | |
| $R_{23}$+25.139 | | | | | 1.78 |
| | $D_{14}$ | .062 | 1.80518 | 25.43 | |
| $R_{24}$+2.256 | | | | | 1.82 |
| | $D_{15}$ | .466 | 1.64328 | 47.96 | |
| $R_{25}$−2.739 | | | | | 1.84 |
| | $S_{10}$ | .005 | | | |
| $R_{26}$+3.259 | | | | | 1.85 |
| | $D_{16}$ | .321 | 1.48749 | 70.41 | |
| $R_{27}$−4.491 | | | | | 1.32 |
| | $S_{11}$ | variable | | | |
| $R_{28}$−2.081 | | | | | 1.33 |
| | $D_{17}$ | .073 | 1.68900 | 49.48 | |
| $R_{29}$+1.456 | | | | | 1.32 |
| | $D_{18}$ | .259 | 1.80518 | 25.43 | |
| $R_{30}$+24.097 | | | | | 1.28 |
| | $S_{12}$ | .966 | | | |
| $R_{31}$−10.766 | | | | | 1.28 |
| | $D_{19}$ | .192 | 1.51821 | 65.05 | |
| $R_{32}$−2.493 | | | | | 1.21 |
| | $S_{13}$ | .201 | | | |
| $R_{33}$+10.462 | | | | | 1.19 |
| | $D_{20}$ | .073 | 1.80518 | 25.43 | |
| $R_{34}$+1.388 | | | | | 1.21 |
| | $D_{21}$ | .321 | 1.55232 | 63.46 | |
| $R_{35}$−2.754 | | | | | |

Thick Lens Separations during Zooming with Object at Infinity

| F | $S_4$ | $S_7$ | $S_9$ | $S_{11}$ |
|---|---|---|---|---|
| 1.0 | 1.0940 | .0966 | 2.7941 | .2582 |
| 1.425 | .9214 | .7683 | 2.1224 | .4308 |
| 2.110 | .7121 | 1.4424 | 1.4482 | .6401 |
| 3.220 | .4676 | 2.1144 | .7763 | .8846 |
| 5.000 | .1962 | 2.7862 | .1045 | 1.1560 |

Thick Lens Separations during Focusing

| d | $\Delta S_2$ | $\Delta S_4$ |
|---|---|---|
| ∞ | 0 | 0 |
| 157.8 | −.129 | +.129 |
| 94.7 | −212 | +.212 |
| 17.61 | −1.013 | +1.013 |

Table 9 — Fo = 1

| Radius | Thickness or Air Separation | | Refractive Index $n_d$ | Abbe V Number | Clear Diameter |
|---|---|---|---|---|---|
| $R_1$+7.036 | | | | | 5.70 |
| | $D_1$ | .207 | 1.65160 | 58.52 | |
| $R_2$+4.266 | | | | | 5.14 |
| | $S_1$ | .678 | | | |
| $R_3$+15.837 | | | | | 5.12 |
| | $D_2$ | .207 | 1.65160 | 58.52 | |
| $R_4$+6.628 | | | | | 4.79 |
| | $S_2$ | 1.269 | | | |
| $R_5$+21.668 | | | | | 4.37 |

| | | | | |
|---|---|---|---|---|
| $R_6$+3.649 | $D_3$ | .207 | 1.64250 | 57.96 |
| $R_7$+8.307 | $D_4$ | .414 | 1.80518 | 25.43 |
| | $S_3$ | .554 | | |
| $R_8$−6.631 | | | | |
| $R_9$−28.611 | $D_5$ | .207 | 1.72000 | 50.41 |
| | $S_4$ | variable | | |
| $R_{10}$−167.054 | | | | |
| $R_{11}$+8.066 | $D_6$ | .171 | 1.80518 | 25.43 |
| $R_{12}$−6.777 | $D_7$ | .502 | 1.62041 | 60.33 |
| | $S_5$ | .005 | | |
| $R_{13}$+8.448 | | | | |
| $R_{14}$+4.515 | $D_8$ | .171 | 1.80518 | 25.43 |
| $R_{15}$−13.268 | $D_9$ | .539 | 1.64050 | 60.10 |
| | $S_6$ | .005 | | |
| $R_{16}$+4.103 | | | | |
| $R_{17}$+25.436 | $D_{10}$ | .378 | 1.64050 | 60.10 |
| | $S_7$ | variable | | |
| $R_{18}$+5.077 | | | | |
| $R_{19}$+1.742 | $D_{11}$ | .073 | 1.78800 | 47.40 |
| | $S_8$ | 1.370 | | |
| $R_{20}$−2.215 | | | | |
| $R_{21}$+2.085 | $D_{12}$ | .073 | 1.72000 | 50.41 |
| $R_{22}$−18.794 | $D_{13}$ | .280 | 1.80518 | 25.43 |
| | $S_9$ | variable | | |
| $R_{23}$+25.139 | | | | |
| $R_{24}$+2.255 | $D_{14}$ | .062 | 1.80518 | 25.43 |
| $R_{25}$−2.791 | $D_{15}$ | .466 | 1.65830 | 57.26 |
| | $S_{10}$ | .005 | | |
| $R_{26}$+3.146 | | | | |
| $R_{27}$−5.067 | $D_{16}$ | .321 | 1.48749 | 70.41 |
| | $S_{11}$ | variable | | |
| $R_{28}$−2.102 | | | | |
| $R_{29}$+1.487 | $D_{17}$ | .073 | 1.69680 | 56.18 |
| $R_{30}$+22.637 | $D_{18}$ | .259 | 1.80518 | 25.43 |
| | $S_{12}$ | .721 | | |
| $R_{31}$+863.11 | | | | |
| $R_{32}$−2.523 | $D_{19}$ | .192 | 1.48749 | 70.41 |
| | $S_{13}$ | .487 | | |
| $R_{33}$+15.646 | | | | |
| $R_{34}$+1.332 | $D_{20}$ | .073 | 1.80518 | 25.43 |
| $R_{35}$−2.629 | $D_{21}$ | .321 | 1.55232 | 63.46 |

Thick Lens Separations during Zooming with Object at Infinity

| F | $S_4$ | $S_7$ | $S_9$ | $S_{11}$ |
|---|---|---|---|---|
| 1.0 | 1.3592 | .1134 | 2.7960 | .2482 |
| 1.425 | 1.1866 | .7852 | 2.1242 | .4207 |
| 2.110 | .9773 | 1.4593 | 1.4501 | .6300 |
| 3.220 | .7328 | 2.1313 | .7781 | .8745 |
| 5.000 | .4614 | 2.8030 | .1064 | 1.1460 |

Thick Lens Separations during Focusing

| d | $\Delta S_2$ | $\Delta S_4$ |
|---|---|---|
| ∞ | 0 | 0 |
| 157.8 | −.126 | +.126 |
| 94.7 | −.207 | +.207 |
| 17.6 | −.982 | +.982 |

In each of the first three examples, the maximum value $Fm$ of the equivalent focal length of the objective in the range of variation is 10 times the minimum value $Fo$ thereof. The back focal distance, from the rear surface of the objective to the image plane, is 0.7530 $Fo$ in the first two examples and, measured through air, 3.828 $Fo$ in the third example.

The objective of each example covers a semi-angular field of view varying from 30° at $Fo$ to 3° at $Fm$, while the relative aperture is $f/2.0$ in the first two examples and $f/2.1$ in the third example.

In the first two examples, the iris diaphragm is stationary and located just in front of the surface $R_{29}$ of the rear assembly. In the third example, it is located immediately in front of the surface $R_{28}$.

As far as the basic zoom lens is concerned, the first and second examples have identical second, third and fourth members. The equivalent focal length $f_2$ of the second member (surfaces $R_{10}$ to $R_{16}$ inclusive) is 6.9394 $Fo$, that $(f_3)$ of the third member (surfaces $R_{17}$ to $R_{23}$) is −3.1328 $Fo$, while that $(f_4)$ of the fourth member (surfaces $R_{24}$ to $R_{28}$) is 4.1000 $Fo$. The distance $x$ is equal to 9.5474 and the magnification ratios $g_2$, $g_3$ and $g_4$ are respectively equal to 1.4180, 3.0000 and 2.3507. In the third example, the second, third and fourth members, surfaces $R_{10}$ to $R_{17}$, surfaces $R_{18}$ to $R_{21}$, and surfaces $R_{22}$ to $R_{27}$, respectively, have respective equivalent focal lengths of 6.2875, −3.1562 and 4.8324. The distance $x$ is equal to 12.1790 and the magnification ratios $g_2$, $g_3$ and $g_4$ are respectively equal to 1.552, 3.2179 and 2.0028.

The present invention is particularly concerned with the front member provided at the front of the objective to facilitate focusing. The front member has a focal length $F_A$ equal to −8.7623 $Fo$ in the first example, −8.7644 $Fo$ in the second, and −6.8373 $Fo$ in the third example. It comprises in each case a front part consisting of two simple meniscus components convex to the front, and a rear part consisting of a cemented doublet component followed by a simple dispersive component. Only the rear part is movable for focusing, in accordance with the final sections of the above tables, under the control of the focusing control element. Focusing can be effected down to an object distance as short as 30.2 $Fo$ in the first two examples and 28.1 $Fo$ in the third example, and yet it is to be noticed that this front member is not unduly complex and is of wholly acceptable dimensions. The rear part can be moved by means of an inexpensive conventional mechanism involving low torque, and as the front part remains stationary, no air pumping occurs and no increased strain is placed on the mechanism by virtue of fitting attachments to the front member.

In the first example, the focal length $f_{A1}$ of the front part of the front member is −22.598 $Fo$, i.e., 2.579 $F_A$, while the focal length $f_{A2}$ of the rear part is −17.2785 $Fo$, i.e., 1.9719 $F_A$. Thus $f_{A1} = 1.3078 f_{A2}$.

In the second example, the focal length $f_{A1}$ of the front part of the front member is −23.6025 $Fo$, i.e., 2.693 $F_A$, while that of the rear part is −16.7235 $Fo$, i.e., 1.9081 $F_A$. Thus $f_{A1} = 1.4113 f_{A2}$.

In the third example, the focal length $f_{A1}$ of the front part of the front member is −22.4509 $Fo$, i.e., 3.2835 $F_A$, while the focal length $f_{A2}$ of the rear part is −11.6334 $Fo$, i.e., 1.7015 $F_A$. Thus, $f_{A1} = \mathbf{1.9298} f_{A2}$.

The collective element of the doublet component of the rear part has an Abbe V number of 25.43 in each example, while the average value of the mean refractive indices of two dispersive elements of this rear part is 59.4 in the first example, 60.6 in the second example and 55.37 in the third example. The two simple dispersive components of the stationary front part both have Abbe V numbers of 60.1 in the first two examples, and 49.5 in the third example.

In the rear part of the front member of the first example, the internal contact $R_6$ of the doublet component has a radius equal to $0.4823 f_{A2}$, the materials of the two elements on either side of such surface $R_6$ having refractive indices differing by 0.21614. The radii of the front surfaces $R_5$ and $R_8$ of the two components of the rear part are respectively equal to $1.1961 f_{A2}$ and $0.5324 f_{A2}$.

In the rear part of the front member of the second example, the internal contact $R_6$ has a radius equal to $0.5186 f_{A2}$, and the materials of the two elements on either side of such surface have refractive indices differing by 0.21605. The radii of the surfaces $R_5$ and $R_8$ are respectively equal to $1.2882 f_{A2}$ and $0.4584 f_{A2}$.

In the rear part of the front member of the third example, the internal contact $R_6$ has a radius equal to $0.5690 f_{A2}$, and the materials of the two elements on either side of such surface have refractive indices differing by 0.18477. The radii of the front surfaces $R_5$ and $R_8$ are respectively equal to $2.2510 f_{A2}$ and $0.6199 f_{A2}$.

The first three examples demonstrate the application of the invention to zoom lenses suitable for use in live television photography. Thus, the front members of these three examples all conform to a somewhat narrower range of thin lens constructions than hereinbefore defined, which narrower range is characterized by the relationships:

$4.2 F_A > F_{A1} > 1.8 F_A$
$2.6 F_A > f_{A2} > 1.3 F_A$
$f_{A1} > f_{A2}$.

Further characteristics of this group of front members are as follows:

A. $2.5 f_{A2} > f_{A1} > 1.2 f_{A2}$
B. $2.5 f_{A2} > f_{A1} > 1.5 f_{A2}$
C. The rear part of the front member includes a collective element of a material having an Abbe V number less than 32 and at least one dispersive element of a material whose Abbe V number is at least 1.5 times greater than the Abbe V number of said collective element, while the front part of the front member includes at least one dispersive element whose Abbe V number exceeds 45.
D. The front part of the front member comprises two simple meniscus components convex to the front.
E. The rear part of the front member includes a compound component having a collective internal contact concave to the front.
F. The said internal contact is formed between two elements of materials having mean refractive indices differing by more than 0.1.
G. The rear part of the front member includes a compound component having a collective internal contact concave to the front with a radius of curvature lying between $0.25 f_{A2}$ and $0.75 F_{A2}$.
H. The rear part of the front member comprises a doublet component spaced in front of a dispersive simple component.
I. The front surfaces of said doublet component and said simple component are both concave to the front, the radius of curvature of the former surface lying between $2 f_A$ and $3 f_A$ and that of the latter surface lying between $0.3 f_{A2}$ and $f_{A2}$.

However, the front member of the invention is also suitable for zoom lenses having a smaller focal ratio suited to the otherwise more stringent requirements of cinematography. The fourth to ninth examples demonstrate the application of the invention to zoom lenses of this kind.

In each of these further examples, the maximum value $Fm$ of the equivalent focal length of the objective in the range of variation is five times the minimum value $Fo$ thereof. The back focal distance, from the rear surface of the objective to the image plane, is, for the fourth to ninth examples in sequence, 2.940 Fo, 3.272 Fo, 2.858 Fo, 3.151 Fo, 3.097 Fo and 2.899 Fo.

In each example the objective covers a semi-angular field of view varying from 30° at Fo to 3° at Fm. The relative aperture of the objective is $f/2.8$ in the fourth, eighth and ninth examples and $f/2.9$ in the fifth to seventh examples, whereby N is equal to 2.8 or 2.9 in accordance therewith.

The iris diaphragm is again located just in front of the front surface $R_{28}$ of the rear assembly.

In the fourth example, the equivalent focal length $f_1$ (= $F_A$) of the front member (surfaces $R_1$ to $R_9$) is −4.8000 Fo, the equivalent focal length $f_2$ of the second member (surfaces $R_{10}$ to $R_{17}$) is +3.9290 Fo, the equivalent focal length of the third member (surfaces $R_{18}$ to $R_{22}$) is −1.9300 and the equivalent focal length of the fourth member (surfaces $R_{23}$ to $R_{27}$) is +2.5802, the positive and negative signs representing convergence and divergence respectively.

The corresponding figures for the fifth example in terms of Fo are: $f_1 (F_A) = -3.8425$, $f_2 = 3.1725$, $f_3 = 1.5450$, $f_4 = 2.4108$. For the sixth example: $f_1 (F_A) = -3.8425$, $f_2 = 3.2424$, $f_3 = 1.5450$, $f_4 = 2.4108$. For the seventh example: $f_1 (F_A) = -3.8425$, $f_2 = 3.1605$, $f_3 = 1.5450$, $f_4 = 2.2167$. For the eighth example: $f_1 (F_A) = -3.9798$, $F_2 - 3.3102$, $f_3 = -1.6002$, $f_4 = 2.2198$. For the ninth example: $f_1 (F_A) = -3.9798$, $f_2 = 3.3102$, $f_3 = -1.6002$, $f_4 = 2.2198$.

The magnification ratios $g_2$, $g_3$ and $g_4$ of the second, third and fourth members are respectively 1.2905, 2.1959 and 1.7644 in the fourth example. For the fifth example, $g_2 = 1.3525$, $g_3 = 2.2136$ and $g_4 = 1.6071$. For the sixth example, $g_2 = 1.3503$, $g_3 = 2.1951$ and $g_4 = 1.6869$. For the seventh example, $g_2 = 1.3181$, $g_3 = 2.1912$ and $g_4 = 1.7311$. For the eighth and ninth examples, $g_2 = 1.2972$, $g_3 = 2.1913$ and $g_4 = 1.7589$.

As before, in each example, these magnification ratios are taken in conjunction with $f_2$ and $f_4$ ti impart equal movements of the second and fourth members during zooming.

The present invention is concerned with the front member provided at the front of the objective to facilitate focusing. This again comprises in each case a front part consisting of two simple meniscus components convex to the front, and a rear part consisting of a cemented doublet component followed by a simple dispersive component. Only the rear part is movable for focusing, as indicated in the final sections of the tables, and focusing down to a very short object distance of the order of 30 Fo is again made possible with a front member affording the same further advantages as mentioned in connection with the first three examples.

In the fourth example, the focal length $f_{A1}$ of the front part of the front member is $-15.751$ Fo, about 3.28 $F_A$, while the focal length $f_{A2}$ of the rear part of the front member is $-8.217$ Fo, about 1.71 $F_A$, whereby $f_{A1}\Omega 1.92$ $f_{A2}$.

In the fifth example, $f_{A1} = 9.754$ Fo and $f_{A2} = 7.946$ Fo. In the sixth example, $f_{A1} = -8.654$ Fo and $f_{A2} = -9.018$ Fo, while in the seventh example $f_{A1} = -8.403$ Fo and $F_{A2} = -9.084$ Fo. In the eighth example $f_{A1} = -8.1576$ Fo and $F_{A2} = -10.1318$ Fo, while in the ninth example $f_{A1} = -8.4882$ Fo and $f_{A2} = -9.7203$ Fo. The values of $f_{A1}$ and $f_{A2}$ in terms of $F_A$, and likewise the ratio between $f_{A1}$ and $f_{A2}$, can readily be calculated from these figures for the fifth to ninth examples. In fact, the examples show values for $f_{A1}$ varying from 2.05 $F_A$ (Example 8) up to 3.28 $F_A$ (Example 4) and values for $f_{A2}$ varying from 1.71 $F_A$ (Example 4) up to 2.55 $F_A$ (Example 8). $f_{A1}$ is as low as 0.8 $f_{A2}$ in the eighth example and as high as 1.92 $f_{A2}$ in the fourth example. In fact, for application of the front member of the invention to zoom lenses for cinematographic use, an even distribution of power between the two parts of the objective is usually more important than in the zoom lenses of the first three examples for television use. In general, for the latter use the front member is preferably divided so that $f_{A1} > 1.3 f_{A2}$, whereas for the former use the front member is preferably divided so that $f_{A1}$ lies between about 0.8 $f_{A2}$ and 1.3 $f_{A2}$. The different is due to the requirement in zoom lenses for cinematographic use to provide facility for a higher standard of aberration correction than is necessary for television use.

In contrast to the first three examples, the internal contact $R_6$ of the doublet component in the ear part, while remaining a collective surface, is not always concave to the front in the fourth to ninth examples (see Example 9), while the front surface $R_5$ of said component, which is always concave to the front in the first group of examples, is convex to the front in Example 9. The difference in the mean refractive indices of the materials on either side of the collective contact $R_6$ varies from about 0.16 in Example 9 up to about 0.22 in Example 8. In the fourth to ninth examples, the radius of the surface $R_6$ ranges in numerical value from about 0.37 $f_{A2}$ in Example 9 up to 0.57 $f_{A2}$ in Examples 4 and 5, while the radius of the surface $R_5$ ranges through infinity from $-1.9$ $F_A$ in Example 9 to about 4.0 $F_A$ in Example 2, so that it is always numerically greater than 1.9.

Again referring to the fourth to ninth examples, in the front part of the front member, the Abbe V numbers of the materials of the dispersive elements have values varying from 49.4 to 60.3. In the rear part, each example contains two dispersive elements, the average of the Abbe V numbers of the materials of which show variations from about 1.98 to 2.18 times the Abbe V number of the material of the single collective element.

Generally, unless otherwise stated, the ranges of variation of parameters demonstrated by the fourth to ninth examples also embrace the values for the corresponding parameters in the first to third examples.

The front member of each of the above mentioned first to ninth examples, by virtue of the choice of parameters mentioned within the ranges specified according to the further features of the invention, provides a high standard of aberration stabilization throughout the range of focusing movement. It also cooperates with the particular zooming system described also to provide for good stabilization of aberrations during zooming, so that the stabilized aberrations in the front assembly (the first four members) can be balanced out by suitable design of the rear assembly in accordance with conventional practice in the art. Because only the rear part of the front member is movable for focusing, aberration stabilization with focusing is simplified so that, for a corresponding high standard of correction, the complexity of the whole of the front member may be lessened by comparison with an objective in which the front member is bodily movable. At the same time, and again by comparison with an objective in which the front member is bodily movable for focusing, each example exhibits a smaller change in the angular field in the object space as focusing is performed. In the third and fourth examples especially, a compromise has been effected in respect of the value of the ratio $f_{A1} : f_{A2}$, whereby this design parameter makes a substantial contribution, not only to minimizing variation in said angular field in the object space, but also to achievement of a high standard of aberration correction. In this connection it should be made clear that the various parameters in the above-described examples may be varied, in an inter-related manner according to complex optical laws, somewhat to vary the characteristics of the final objective. For example, within the ranges hereinbefore specified, the parameters of the front member may be varied to increase the ratio $f_{A1} : F_{A2}$, thereby to achieve even less variation of the angular field in the object space as focusing is performed, but with some loss in facility for aberration correction. Again, all the above-described examples provide a reasonable compromise (differing in the various nine cases) between stabilization of aberrations with zooming and stabilization of aberrations with focusing. The balance in this respect can also be adjusted by variation of certain design parameters. Such changes are relatively minor and, generally speaking, do not necessitate recalculation of the whole objective. As far as the present invention is concerned, the permissible limits of variation for the parameters of the front member, from the values stated in respect of each of the above examples, are $\pm 0.5/F_A$ for the optical powers of the various surfaces and $\pm 0.05$ $F_A$ for the axial thicknesses of the elements and the air spaces between components, excluding physically impossible constructions.

It has been previously mentioned that the basic construction of zoom lens described is in itself especially well suited to provision of a divergent front member capable of focusing down to short object distances. A prerequisite for this is the condition that the focal length of the front member exceeds the focal length of the second member. In combination with the present invention, it is readily possible to make $F_A$ exceed $f_2$ without in any way scaling up the front member to undesirable proportions (this is clear from the above examples), so that a remarkable advance in the art is achieved. However, it should be emphasized that the present invention is not limited to use in basic construction of zoom lens described and is useful to facilitate the design of a front member for any zoom lens wherein the front member is necessarily divergent. In this connection it should be explained that although, as above mentioned, the front member contributes to some extent to the stabilization of aberrations during zooming, the contribution that is required of the front member is generally the same in all modern zoom lenses having a divergent front member, so that the relationships hereinbefore specified in connection with aberration correction are of general applicability.

By way of further elucidation, especially as to the wide applicability of the invention, possible thin lens modifications of three known zoom lenses will now be described.

Firstly, British Patent Specification No. 949,465 discloses a zoom lens having five members, of which the first and third members are divergent and stationary during zooming and the fifth member is convergent and stationary during zooming, while the second and fourth members are convergent and linked to perform equal zooming movements. In one example, the equivalent focal lengths of these members are, reading from front to rear, −237.04, 109.04, −73.00, 111.20 and 142.03, assuming the maximum focal length ($Fm$) of the complete lens to be 100. In this lens, focusing can be effected by a bodily movement of the front member, a forward movement of 51.40 being necessary to focus down from an object at infinity to an object at distance 800. Such a focusing movement produces an effective increase in the semi-angular field of view of from 20° for focusing at infinity to 21°40¹ for focusing at distance 800.

According to the invention, the front member of this known lens is split into two parts of equivalent focal length $f_{A1} = -600.00$ and $f_{A2} = -444.10$, with an axial separation of 80. Focusing from infinity down to distance 800 may then be effected with a forward movement, of the rear part of the front member only, through a distance of 72.90, the semi-angular field of view remaining substantially 20° throughout this focusing movement.

East German Specification No. 48,057 discloses a somewhat similar five member zoom lens wherein the members have a similar disposition of powers, but the second and fourth members perform unequal movements during zooming. In one embodiment, the equivalent focal lengths of the five members are, respectively, −133.80, 64.88, −35.70, 71.52 and 119.02, where $Fm = 100$. Focusing may be effected by a bodily movement of the front member, forward through a distance of 28.20 for focusing down from infinity to distance 500. The semi-angular field of view changes during this focusing movement from 49° 42¹ to 51° 30¹.

According to the invention, the front member of this second known lens is split into two parts wherein $f_{A1} = -338.70$ and $f_{A2} = -250.70$, with an axial separation of 45.20. Comparable focusing can then be effected by a forward movement of the rear part of the front member only, through a distance of 37.50, the semi-angular field of view remaining substantially constant at 49° 42¹.

Thirdly, U.S. Pat. No. 3,143,590 discloses a three member zoom lens wherein the first and third members are divergent and stationary during zoom and the middle member is convergent and movable for zooming. In one embodiment, the equivalent focal lengths of the three members are, respectively, −238.66, 144.16 and −238.66, where $Fo = 100$. The lens can be focused from infinity down to distance 800 by a bodily forward movement of the front member through a distance of 51.7, the semi-angular field of view increasing from 20° to 21° 30¹.

According to the invention, this front member is split into two parts wherein $f_{A1} = 604.80$ and $f_{A2} = 447.10$, with an axial separation of 80.54. Focusing to a comparable extent can then be effected by a forward movement, of the rear part of the front member only, through a distance of 73.60, the semi-angular field of view remaining substantially constant at 20° throughout.

The last three thin lens examples are optimized examples providing, for each of the known zoom lenses referred to, a two part front member in which a good compromise has been achieved between the requirements of avoiding or minimizing increase in dimensions of the front member, both in the axial and in the radial directions, and of providing a distribution of powers between the two parts which provides for the possibility of good aberration correction in a thick lens design.

We claim

1. In an optical objective of the zoom type having a stationary rear assembly and a front assembly which includes the members movable for zooming and a divergent front member by means of which the objective is focused but which, for a given object position, remains stationary during the zooming relative movements; an improved front member which is divided into divergent front and divergent rear parts of which only the rear part is movable for focusing purposes, which front member is characterized by the following relationships:

$4.2 F_A > f_{A1} > 1.5 F_A$,
$3.0 F_A > f_{A2} > 1.3 F_A$,
$3.0 f_{A2} > f_{A1} > 0.6 f_{A2}$, where $F_A$ is the equivalent focal length of the complete front member for an infinitely distant object and $f_{A1}$ and $f_{A2}$ are the equivalent focal lengths of the front and rear parts, respectively, of the front member.

2. A zoom objective front member according to claim 1, wherein:

$3.3 F_A > f_{A1} > 2.0 F_A$
$2.6 F_A > f_{A2} > 1.7 F_A$
$2.0 f_{A2} > f_{A1} > 0.8 f_{A2}$

3. A zoom objective front member according to claim 1, wherein the rear part of the front member includes a collective element of a material having an Abbe V number less than 26, and at least one dispersive element of a material having an Abbe V number at least 1.9, times greater than the Abbe V number of said collective element, whilst the front part of the front member includes at least one dispersive element of a material having an Abbe V number exceeding 45, 4. A zoom objective front member according to claim 1, wherein the front part of the front member comprises two simple meniscus components convex to the front and the rear part of said member includes a compound component having a collective internal contact formed between two elements of materials differing in refractive index.

5. A zoom objective front member according to claim 4, wherein said internal contact has a radius of curvature numerically lying between 0.37 $f_{A2}$ and 0.57 $f_{A2}$.

6. A zoom objective front member according to claim 1, wherein the rear part of the front member comprises a doublet component spaced in front of a dispersive simple component, the front surface of said doublet component having a radius of curvature numerically between $1.1 f_{A2}$ and $3.5 f_{A2}$ the front surface of said simple component having a radius of curvature lying numerically between $0.45 f_{A2}$ and $0.7 f_{A2}$.

7. An optical objective having a front member according to claim 1, wherein the front assembly also comprises second, third and fourth members which are respectively convergent, divergent and convergent, the second and fourth members moving forward for zooming towards maximum focal length in association with rearward movement of the third member.

8. An optical objective according to claim 7, wherein:
 a. $2.5 \, Fm/N > f_2 > f_4 > f_3 > 1$
 b. $1.5 \sqrt{R} > g_3 > g_4 > g_2 > 1$, where $Fm$ is the maximum value of the equivalent focal length of the complete objective; $N$ is the $f$-number of the objective; $f_2$, $f_3$ and $f_4$ are respectively the equivalent focal lengths of the second, third and fourth members; $g_2$, $g_3$ and $g_4$ are respectively the ratios between maximum and minimum magnifications of the second, third and fourth members; and $R$ is the ratio of the maximum to the minimum equivalent focal lengths of the complete objective.

9. An optical objective according to claim 8, wherein $F_A$ lies between $f_2$ and $1.5 f_2$.

10. In an optical objective of the zoom type having a stationary rear assembly and a front assembly which includes the members movable for zooming and a divergent front member by means of which the objective is focused but which, for a given object position, remains stationary during the zooming relative movements; an improved front member which is divided into divergent front and divergent rear parts of which only the rear part is movable for focusing purposes, which front member is characterized by the following relationships:

$4.2 \, F_A > f_{A1} > 1.75 \, F_A$
$3.0 \, F_A > f_{A2} > 1.5 \, F_A$
$2.7 f_{A2} > f_{A1} > 0.6 f_{A2}$ where $F_A$ is the equivalent focal length of the complete front member for an infinitely distant object and $f_{A1}$ and $f_{A2}$ are the equivalent focal lengths of the front and rear pats, respectively, of the front member.

* * * * *